US012454186B2

(12) United States Patent
Connors et al.

(10) Patent No.: US 12,454,186 B2
(45) Date of Patent: Oct. 28, 2025

(54) SYSTEM AND METHOD FOR OPERATING AN ELECTRIC VEHICLE IN VARYING OPERATING CONDITIONS

(71) Applicant: TAIGA MOTORS INC., Lasalle (CA)

(72) Inventors: Shawn Connors, Bois-des-Filion (CA); Samuel Bruneau, Montreal (CA); Gabriel Bernatchez, Montreal (CA); Cyrus Larsen, Vancouver (CA); Christophe Petitclerc-Demers, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 143 days.

(21) Appl. No.: 18/539,980

(22) Filed: Dec. 14, 2023

(65) Prior Publication Data

US 2024/0208337 A1    Jun. 27, 2024

Related U.S. Application Data

(60) Provisional application No. 63/434,508, filed on Dec. 22, 2022.

(51) Int. Cl.
*B60L 15/20* (2006.01)
*B62J 43/16* (2020.01)
*B62M 27/02* (2006.01)

(52) U.S. Cl.
CPC ........... *B60L 15/20* (2013.01); *B60L 15/2045* (2013.01); *B62J 43/16* (2020.02); *B62M 27/02* (2013.01); *B60L 2240/12* (2013.01); *B60Y 2200/252* (2013.01)

(58) Field of Classification Search
CPC .. B60L 15/20; B60L 15/2045; B60L 2240/12; B62J 43/16; B62M 27/02; B60Y 2200/252
See application file for complete search history.

(56) References Cited

U.S. PATENT DOCUMENTS

| 8,214,122 | B2 | 7/2012 | Krupadanam |
| 8,666,577 | B2 | 3/2014 | Ross |
| 9,321,370 | B2 | 4/2016 | Higashitani |
| 10,245,970 | B2 | 4/2019 | Gregg |

(Continued)

*Primary Examiner* — Michael J Zanelli
(74) *Attorney, Agent, or Firm* — Norton Rose Fulbright Canada LLP

(57) ABSTRACT

Systems and methods are provided to allow a temporary power boost beyond a restricted power output associated with a restricted operating mode of an electric vehicle to be provided to accommodate challenging operating conditions. A method includes, when the electric vehicle is in the restricted operating mode, receiving an operator propulsion command equal to or exceeding a propulsion command threshold. The powertrain of the electric vehicle is commanded to generate a first power output corresponding to the operator propulsion command where the first power output is lower than or equal to the restricted power output. When the operator propulsion command is equal to or exceeding the propulsion command threshold and the actual speed of the electric vehicle is below a speed threshold, the powertrain of the electric vehicle is commanded to generate a second power output exceeding the restricted power output in response to the operator propulsion command.

20 Claims, 14 Drawing Sheets

(56) References Cited

U.S. PATENT DOCUMENTS

| | | | | |
|---|---|---|---|---|
| 2015/0314775 A1* | 11/2015 | Dextreit | ................ | B60W 10/08 |
| | | | | 180/65.265 |
| 2017/0341704 A1* | 11/2017 | Bobinger | ................. | B62M 6/50 |
| 2019/0185015 A1 | 6/2019 | Kim | | |
| 2021/0129680 A1 | 5/2021 | Bruneau et al. | | |

* cited by examiner

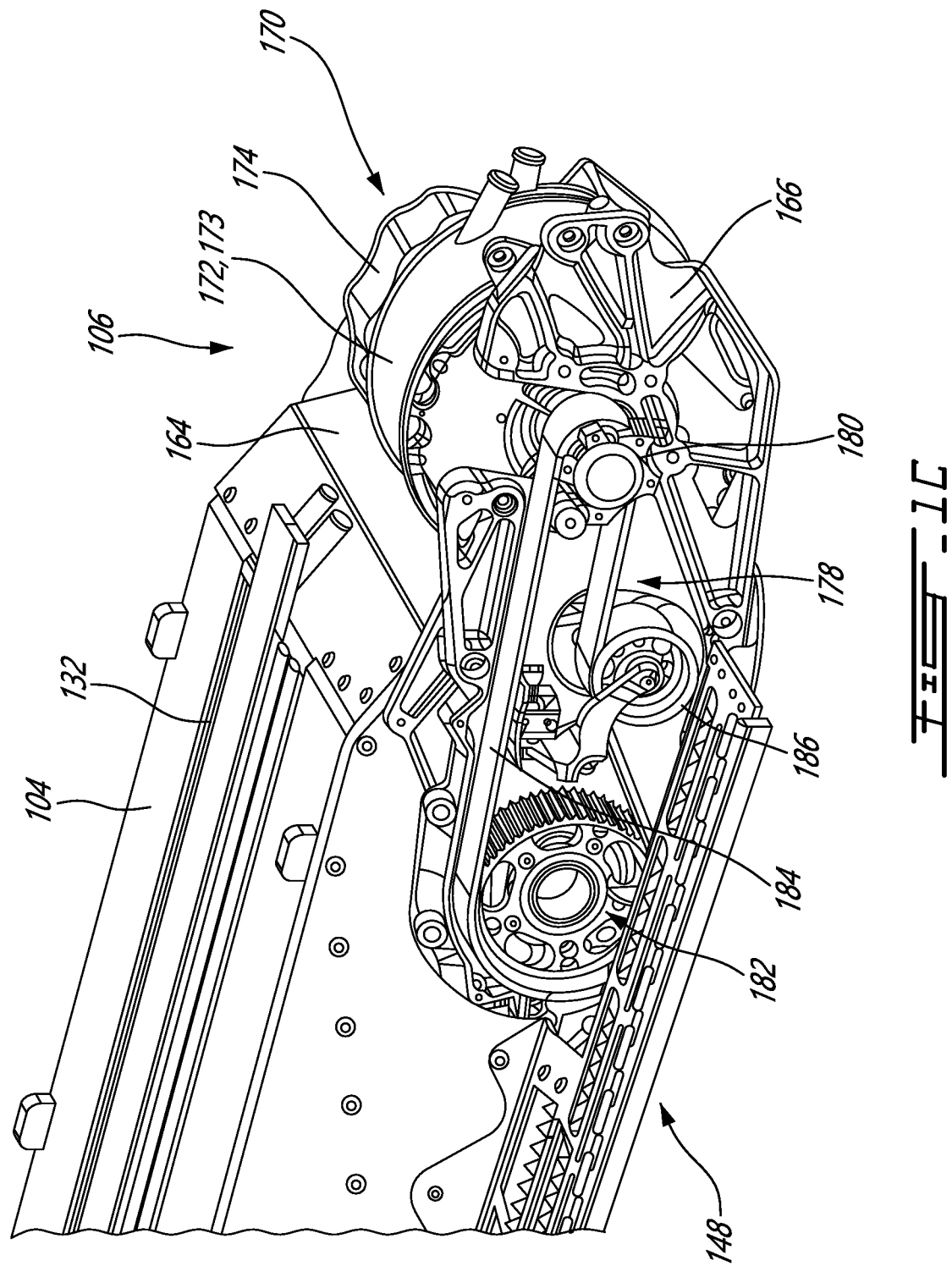

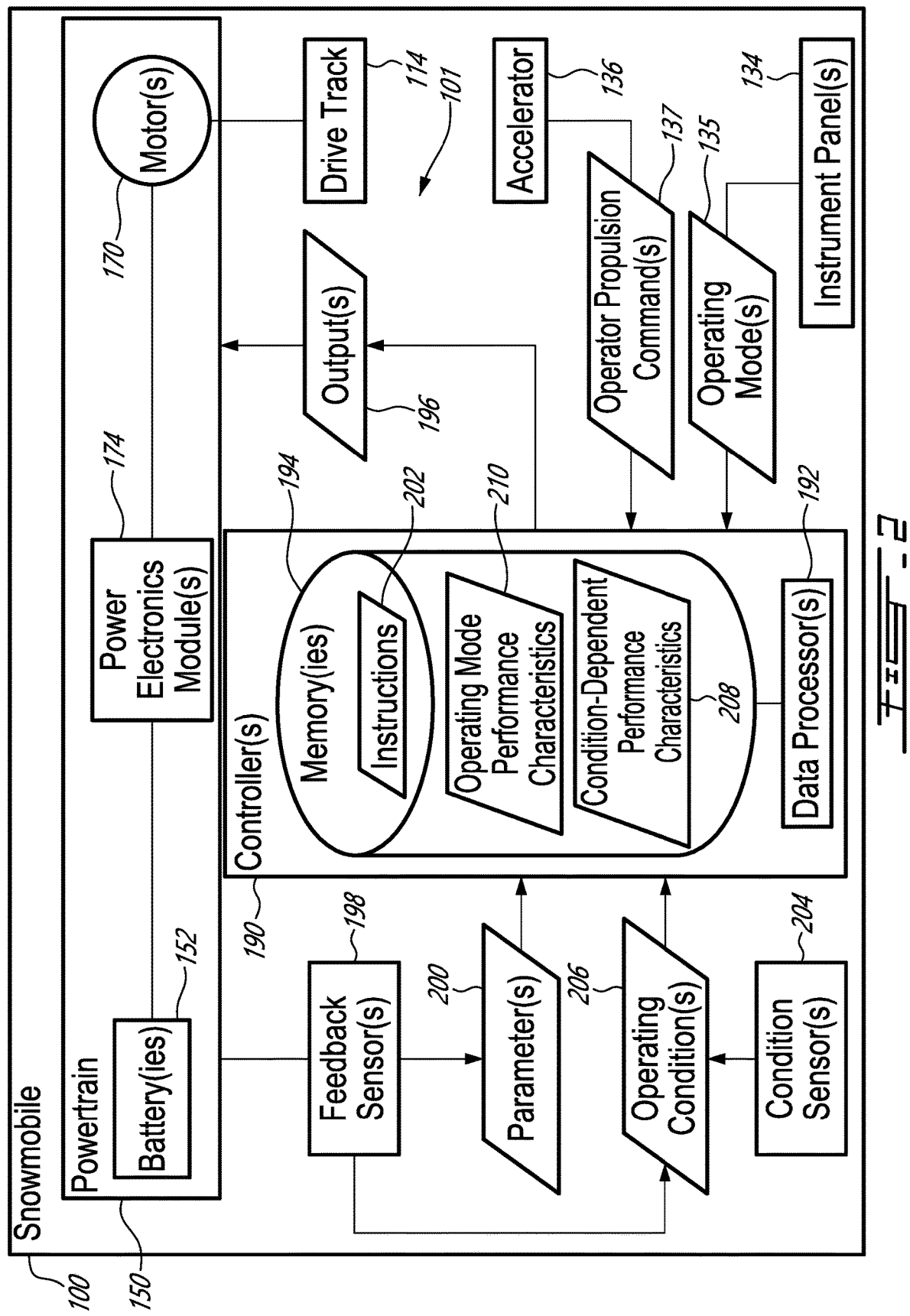

| OPERATING MODE | RESTRICTED SPEED | RESTRICTED POWER OUTPUT 1004 |
|---|---|---|
| POWER-SAVING | RS1 | RPO1 |
| NORMAL | RS2 (RS2 > RS1) | RPO2 (RPO2 > RPO1) |
| HIGH-PERFORMANCE | RS3 (RS3 > RS2) (e.g., RS3 = maximum vehicle speed) | RPO3 (RPO3 > RPO2) (e.g., RPO3 = maximum available power output from powertrain) |

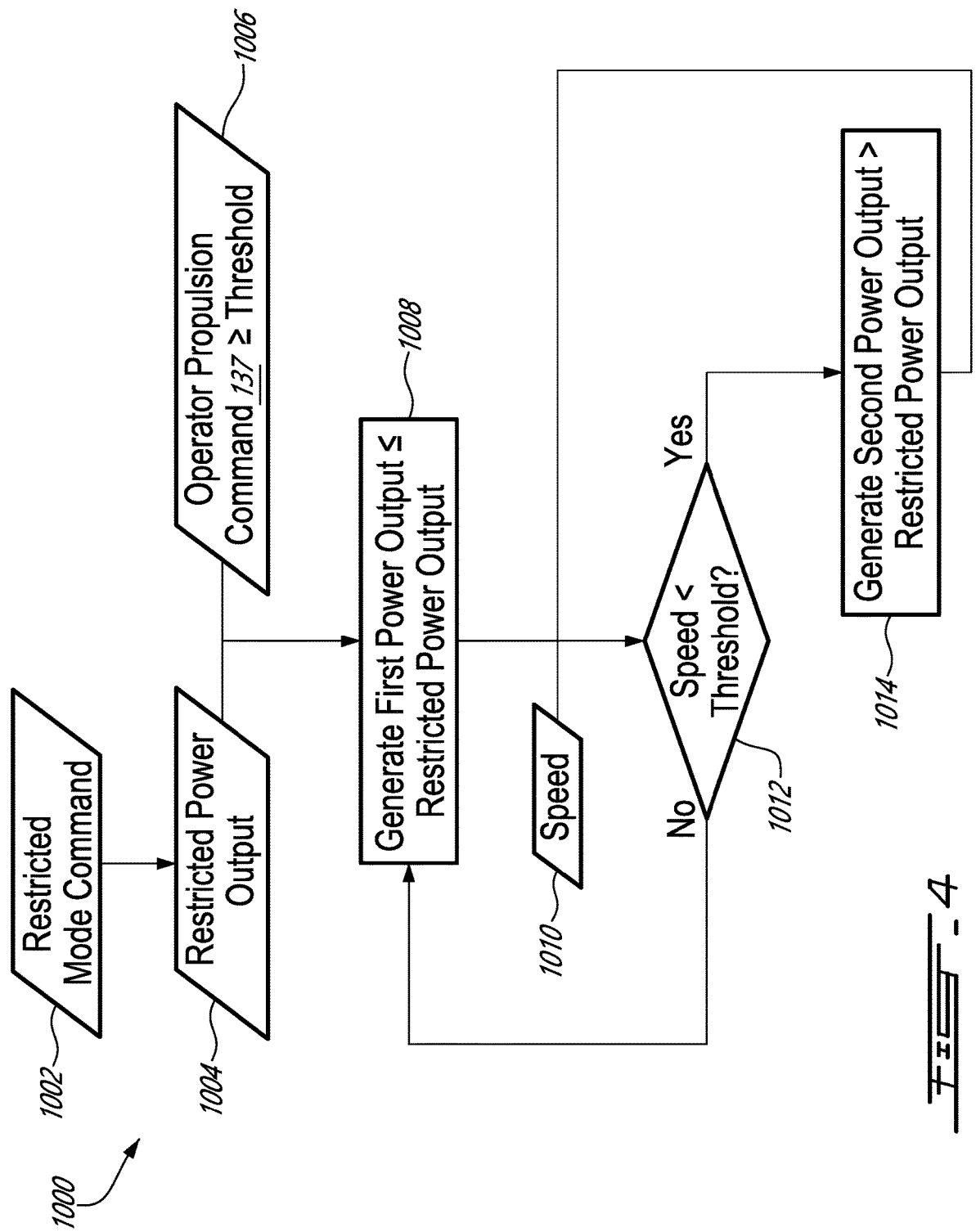

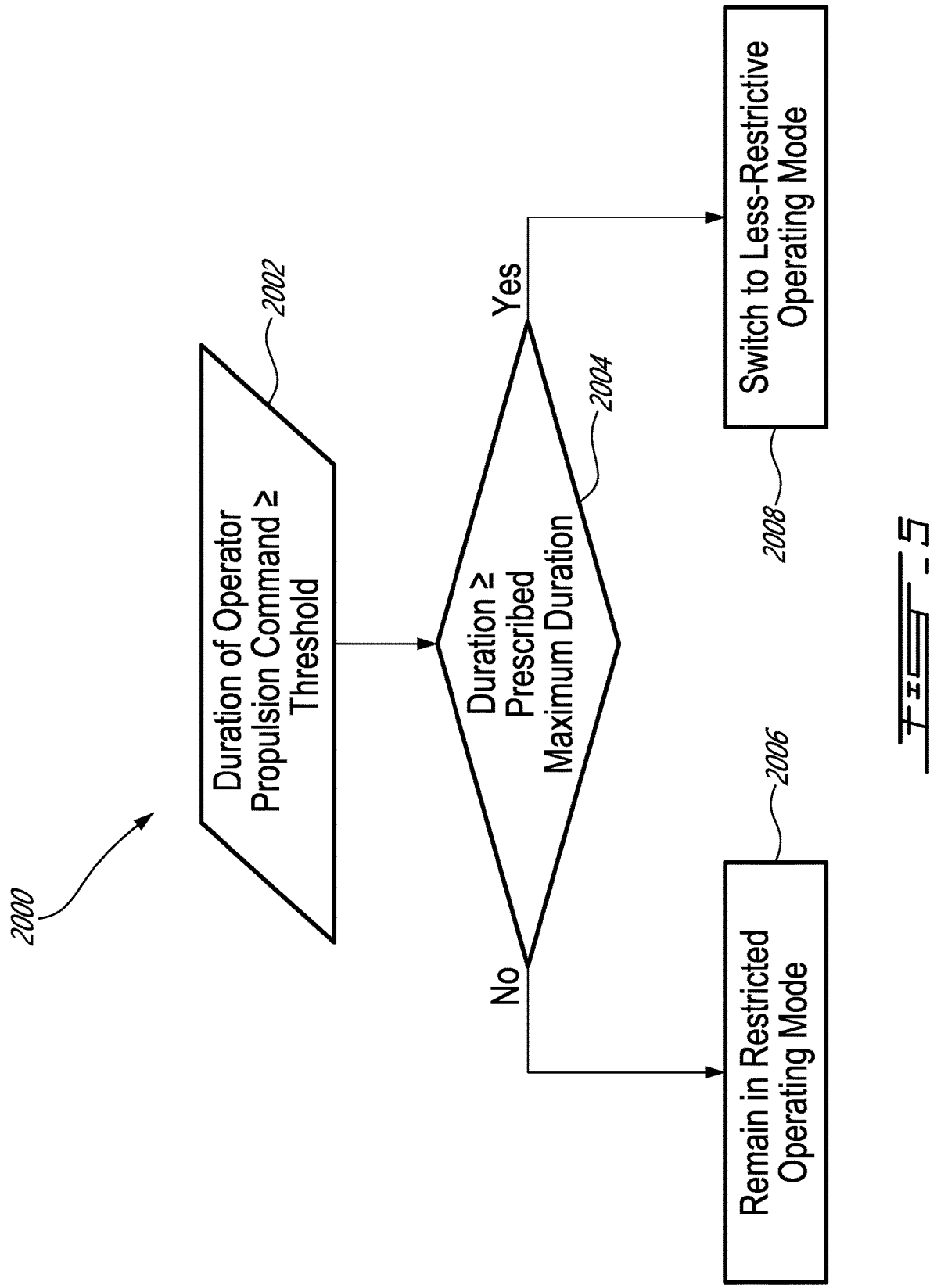

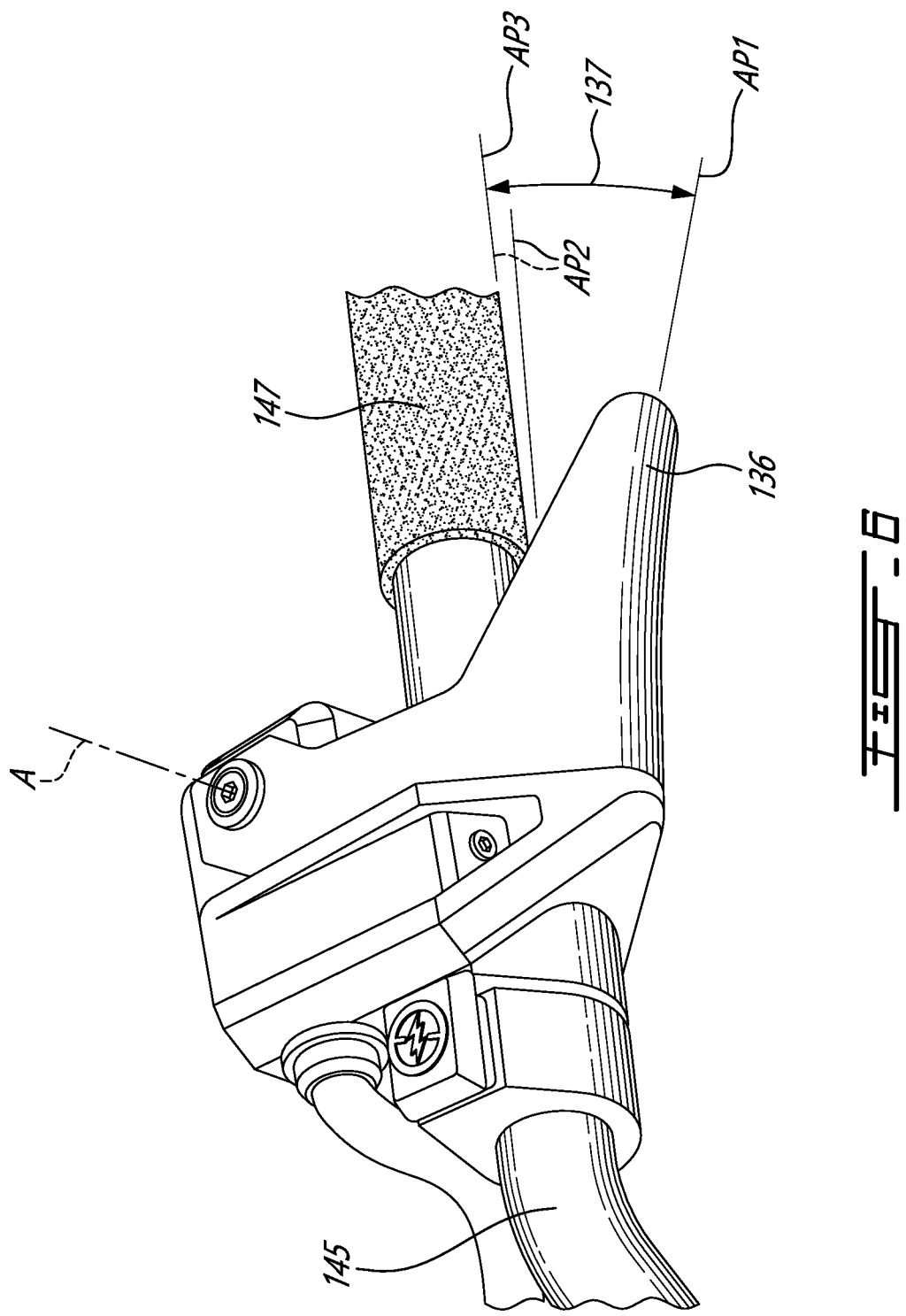

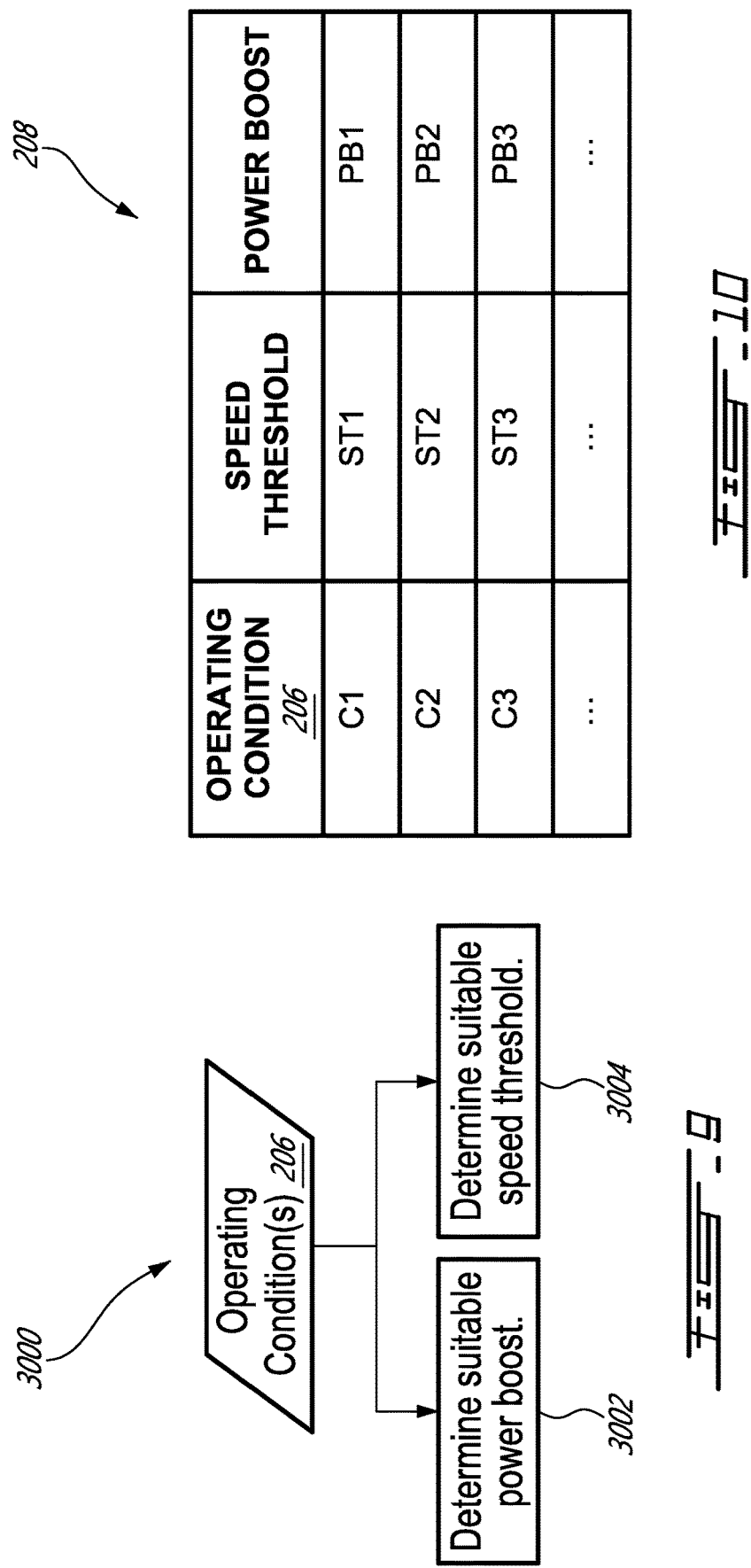

SYSTEM AND METHOD FOR OPERATING AN ELECTRIC VEHICLE IN VARYING OPERATING CONDITIONS

CROSS-REFERENCE TO RELATED APPLICATION(S)

This application claims priority from U.S. Provisional Patent Application No. 63/434,508, filed Dec. 22, 2022, which is incorporated by reference in its entirety herein.

TECHNICAL FIELD

The disclosure relates generally to electric vehicles, and more particularly to operating electric vehicles.

BACKGROUND

Off-road vehicles such as snowmobiles, all-terrain vehicles (ATVs) and utility terrain vehicles (UTVs) can be operated in a variety of conditions (e.g., terrains). In more challenging conditions, off-road vehicles can sometimes get impeded or stuck. Improvement is desirable.

SUMMARY

In one aspect, the disclosure describes a method of operating an electric vehicle. The method comprises:
receiving a restricted mode command to operate the electric vehicle in a restricted operating mode defining a restricted power output from a powertrain of the electric vehicle, the restricted power output being lower than a maximum power output available from the powertrain of the electric vehicle;
when the electric vehicle is in the restricted operating mode, receiving an operator propulsion command from an operator of the electric vehicle, the operator propulsion command being equal to or exceeding a propulsion command threshold;
commanding the powertrain of the electric vehicle to generate a first power output corresponding to the operator propulsion command, the first power output being lower than or equal to the restricted power output;
when the powertrain of the electric vehicle is generating the first power output, measuring an actual speed of the electric vehicle; and
when the operator propulsion command is equal to or exceeding the propulsion command threshold, the actual speed of the electric vehicle is below a speed threshold and the electric vehicle is in the restricted operating mode, commanding the powertrain of the electric vehicle to generate a second power output exceeding the restricted power output in response to the operator propulsion command.

Commanding the powertrain of the electric vehicle to generate the second power output may comprise controlling the second power output to inhibit the electric vehicle from exceeding the speed threshold.

The speed threshold may be equal to a restricted speed associated with the restricted operating mode.

Commanding the powertrain of the electric vehicle to generate the second power output may be conditioned upon the operator propulsion command being equal to or exceeding the propulsion command threshold for a first prescribed duration.

Commanding the powertrain of the electric vehicle to generate the second power output may be conditioned upon the actual speed being below the speed threshold for a second prescribed duration.

The operator propulsion command may be a first operator propulsion command; and the method may include: receiving a second operator propulsion command from an operator of the electric vehicle, the second operator propulsion command being lower than the propulsion command threshold; in response to the second operator propulsion command being lower than the propulsion command threshold: commanding the powertrain of the electric vehicle to generate a third power output corresponding to the second operator propulsion command, the third power output being lower than the restricted power output; and causing the electric vehicle to remain in the restricted operating mode.

Commanding the powertrain of the electric vehicle to generate the second power output may be conditioned upon the operator propulsion command including an accelerator of the electric vehicle being actuated at least to a prescribed actuation amount.

The prescribed actuation amount may be equal to or greater than 95% of a full actuation of the accelerator.

The method may comprise ceasing to command the powertrain of the electric vehicle to generate the second power output exceeding the restricted power output when the accelerator of the electric vehicle is actuated by less than the prescribed actuation amount.

Commanding the powertrain of the electric vehicle to generate the second power output exceeding the restricted power output may be conditioned upon the operator propulsion command corresponding to an accelerator of the electric vehicle being fully actuated.

The actual speed of the electric vehicle may be a global positioning system (GPS) speed of the electric vehicle.

The electric vehicle may include a ground-engaging member. The actual speed of the electric vehicle may be based on an operating speed of the ground-engaging member.

The ground-engaging member may include a track.

The speed threshold may correspond to an expected speed of the electric vehicle when the powertrain of the electric vehicle is operated to generate the restricted power output.

The speed threshold may be a predetermined non-variable value.

The speed threshold may be variable during a current driving session of the electric vehicle.

The speed threshold may correspond to a speed of the electric vehicle achieved during the current driving session of the electric vehicle and with the powertrain of the electric vehicle generating not more than the restricted power output.

The method may comprise: determining a resistive force opposing propulsion of the electric vehicle; and adjusting the speed threshold based on the resistive force.

The method may comprise: sensing an environmental condition in which the electric vehicle is being operated; and adjusting the speed threshold based on the environmental condition.

The environmental condition may include a terrain inclination.

The method may comprise: sensing an operating condition of the electric vehicle; and adjusting the second power output based on the operating condition.

The operating condition may be indicative of a resistive force opposing propulsion of the electric vehicle.

The method may comprise, when a duration during which the powertrain of the electric vehicle is commanded to exceed the restricted power output reaches a third prescribed duration: ceasing to command the powertrain of the electric vehicle to exceed the restricted power output; and causing the electric vehicle to remain in the restricted operating mode.

The method may comprise, when a duration during which the powertrain of the electric vehicle is commanded to exceed the restricted power output reaches a third prescribed duration, causing the electric vehicle to transition to another operating mode less restrictive than the restricted operating mode.

The method may comprise, after causing the electric vehicle to transition to the other operating mode, enabling the powertrain of the electric vehicle to exceed the speed threshold.

The electric vehicle may be caused to transition to the other operating mode while the operator propulsion command is being received. The method may include: ceasing to receive the operator propulsion command; and keeping the electric vehicle in the other operating mode after ceasing to receive the propulsion command.

The method may comprise communicating the restricted power output and the second power output exceeding the restricted power output to the operator of the electric vehicle.

Embodiments may include combinations of the above features.

In another aspect, the disclosure describes a computer program product for controlling an operation of an electric vehicle, the computer program product comprising a non-transitory computer readable storage medium having program code embodied therewith, the program code readable and executable by a computer, processor or logic circuit to perform a method as disclosed herein.

In another aspect, the disclosure describes a system for operating an electric vehicle. The system comprises:
  one or more data processors operatively connected to a powertrain of the electric vehicle; and
  non-transitory machine-readable memory storing instructions executable by the one or more data processors and configured to cause the one or more data processors to:
  receive a restricted mode command to operate the electric vehicle in a restricted operating mode defining a restricted power output from a powertrain of the electric vehicle, the restricted power output being lower than a maximum power output available from the powertrain of the electric vehicle;
  when the electric vehicle is in the restricted operating mode, receive an operator propulsion command from an operator of the electric vehicle, the operator propulsion command being equal to or exceeding a propulsion command threshold;
  command the powertrain of the electric vehicle to generate a first power output corresponding to the operator propulsion command, the first power output being lower than or equal to the restricted power output;
  when the powertrain of the electric vehicle is generating the first power output, determine an actual speed of the electric vehicle; and
  when the operator propulsion command is exceeding the propulsion command threshold and the actual speed of the electric vehicle is below a speed threshold and the electric vehicle is in the restricted operating mode, command the powertrain of the electric vehicle to generate a second power output exceeding the restricted power output in response to the operator propulsion command.

The speed threshold may correspond to an expected speed of the electric vehicle when the powertrain of the electric vehicle is operated to generate the restricted power output.

The speed threshold may be a predetermined non-variable value.

The speed threshold may be variable during a current driving session of the electric vehicle.

The system may comprise a sensor for sensing a condition indicative of a resistive force opposing propulsion of the electric vehicle, wherein the instructions are configured to cause the one or more data processors to adjust the second power output based on the condition.

Embodiments may include combinations of the above features.

In another aspect, the disclosure describes an electric off-road vehicle comprising a system as disclosed herein.

In another aspect, the disclosure describes an electric snowmobile comprising a system as disclosed herein.

In another aspect, the disclosure describes an electric vehicle comprising:
  a powertrain including an electric motor for propelling the electric vehicle;
  a motoring battery operatively connected to drive the electric motor;
  an accelerator to receive an operator propulsion command from an operator of the electric vehicle; and
  a controller operatively connected to the powertrain and to the accelerator, the controller being configured to:
  receive a restricted mode command to operate the electric vehicle in a restricted operating mode defining a restricted power output from a powertrain of the electric vehicle, the restricted power output being lower than a maximum power output available from the powertrain of the electric vehicle;
  when the electric vehicle is in the restricted operating mode, receive an operator propulsion command via the accelerator, the operator propulsion command being equal to or exceeding a propulsion command threshold;
  command the powertrain of the electric vehicle to generate a first power output corresponding to the operator propulsion command, the first power output being lower than or equal to the restricted power output;
  when the powertrain of the electric vehicle is generating the first power output, determine an actual speed of the electric vehicle; and
  when the operator propulsion command is exceeding the propulsion command threshold and the actual speed of the electric vehicle is below a speed threshold and the electric vehicle is in the restricted operating mode, command the powertrain of the electric vehicle to generate a second power output exceeding the restricted power output in response to the operator propulsion command.

The speed threshold may correspond to an expected speed of the electric vehicle when the powertrain of the electric vehicle is operated to generate the restricted power output.

The speed threshold may be a predetermined non-variable value.

The speed threshold may be variable during a current driving session of the electric vehicle.

The electric vehicle may comprise a sensor for sensing a condition indicative of a resistive force opposing propulsion of the electric vehicle. The controller may be configured to adjust the second power output based on the condition.

The electric vehicle may be a snowmobile.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 1C is a perspective view of part of the snowmobile of FIG. 1 including an electric motor;

FIG. 2 is an exemplary schematic representation of the snowmobile of FIG. 1;

FIG. 4 is a flow diagram of an exemplary method of operating an electric vehicle such as the snowmobile of FIG. 1;

FIG. 5 is a flow diagram of an exemplary method of automatically switching to a different operating mode in response to a propulsion command;

FIG. 6 is a perspective view of part of the snowmobile of FIG. 1 including an exemplary accelerator;

FIG. 9 is a flow diagram of an exemplary method of determining an allowable power boost beyond a restricted output power and a speed threshold based on an operating condition of the snowmobile of FIG. 1;

FIG. 10 is an exemplary data structure of condition-dependent performance characteristics of the snowmobile of FIG. 1.

DETAILED DESCRIPTION

Figure 1A:
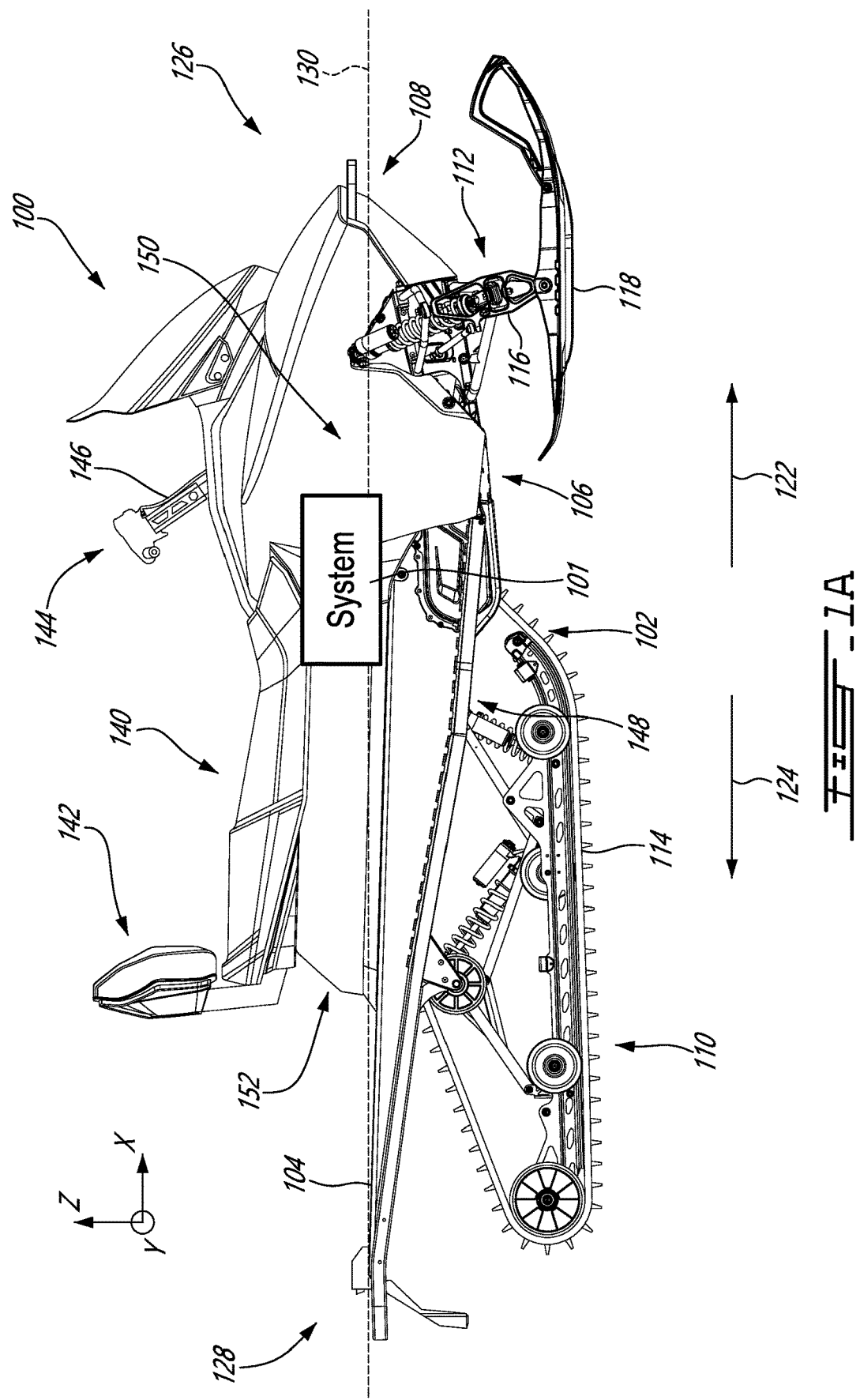
FIG. 1A is a side elevation view of an exemplary snowmobile including a system as described herein.

The following disclosure relates to facilitating the operation of electric (e.g., powersport, off-road) vehicles in various (e.g., varying, more challenging) operating conditions. Non-limiting examples of electric vehicles suitable for the systems and methods described herein include snowmobiles, motorcycles, watercraft such as boats and personal watercraft (PWC), all-terrain vehicles (ATVs), and utility task vehicles (UTVs) (e.g., side-by-sides).

Electric vehicles can have two or more different modes of operation available to an operator (driver). Such modes of operation can be used to adjust performance characteristics of the electric vehicle according to the operator's skill or experience level, or according to the operator's preference(s). For example, an electric vehicle may be equipped with factory-defined operating modes such as a power-saving (e.g., economy or extended range) operating mode, a normal operating mode, and a high-performance (e.g., sport, advanced) operating mode, which may define different performance characteristics of the electric vehicle. Such operating modes may correspond to performance and/or operator skill levels such as novice, intermediate and expert, respectively, and may be defined by factory-defined sets of operating parameters for the electric vehicle. For example, a power-saving operating mode may be a battery-saving operating mode intended to assist the operator in driving in a way that promotes reduced battery consumption and an extended range for the vehicle. A high-performance operating mode may be intended to provide increased acceleration responsiveness and increased speed but with higher battery consumption and consequently a shorter range. A normal operating mode may facilitate a vehicle operation between the power-saving and high-performance modes. In other words, the normal operating mode may be considered a restricted operating mode compared to the high-performance operating mode and may define a lower power output limit from a powertrain of the electric vehicle compared to the high-performance operating mode. Similarly, the power-saving operating mode may be considered a restricted operating mode compared to the normal and high-performance operating modes and may define a lower power output limit from the powertrain of the electric vehicle compared to the normal and high-performance operating modes.

In some situations where the electric vehicle is operated in a restricted (e.g., power-saving or normal) operating mode to extend vehicle range for example, the operator may on occasion desire a temporary increase in power output from the electric vehicle that is beyond what is normally available from the restricted operating mode to traverse challenging operating (e.g., terrain) conditions, for example, and then resume the operation of the electric vehicle in the restricted operating mode after exiting the challenging terrain conditions. Examples of such challenging operating conditions may include deep and/or wet snow, sand, mud, a steep incline, and an obstacle such as a log or rock. For example, the operator may want the increase in power output to increase the speed of the electric vehicle shortly before reaching challenging terrain and/or while traversing the challenging terrain to "power through" the challenging terrain without getting stuck for example.

As explained below, the systems and methods described herein may permit a temporary increase (i.e., boost) in power output that is beyond the restricted operating mode while keeping the vehicle in the restricted operating mode. In other words, the temporary boost in power output may be provided without requiring the operator to release the accelerator and manually switch to a less restrictive operating mode. In some embodiments, the temporary boost in power output may appear to be provided seamlessly and without interrupting propulsion of the electric vehicle during the challenging operating condition.

The temporary boost in power output may facilitate the operation of the electric vehicle through challenging operating conditions while remaining in the restricted operating mode. Following the temporary boost in power output, operation of the electric vehicle in the restricted operating mode may automatically resume to promote reduced battery consumption and extended range for the vehicle.

The term "connected" or "coupled to" may include both direct connection or coupling (in which two elements contact each other) and indirect connection or coupling (in which at least one additional element is located between the two elements). The term "substantially" as used herein may be applied to modify any quantitative representation which could permissibly vary without resulting in a change in the basic function to which it is related.

Figure 1B:
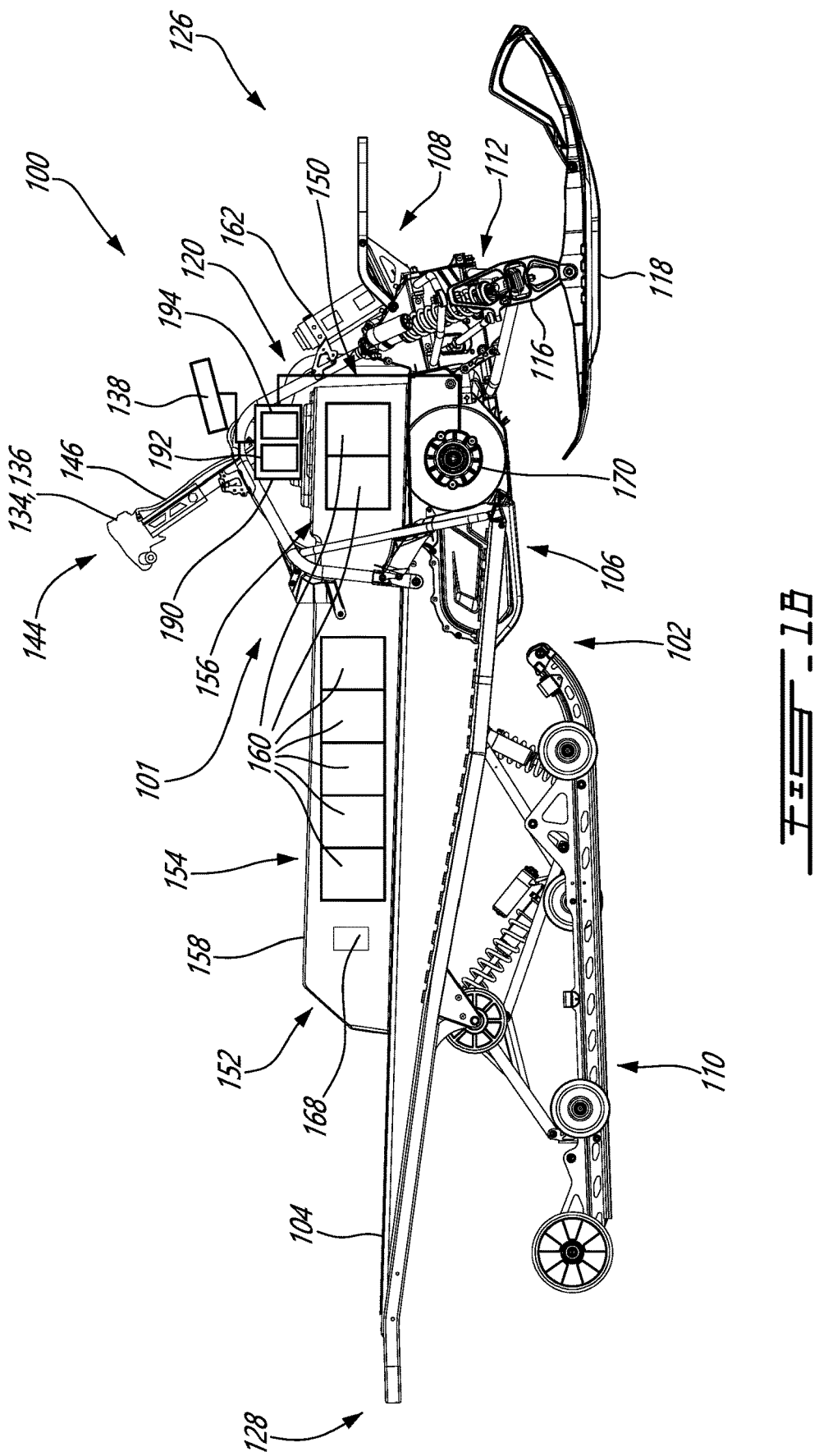
FIG. 1B is a side elevation of the snowmobile of FIG. 1 showing internal components thereof.

FIG. 1A illustrates a side plan view of a snowmobile 100, according to an exemplary embodiment, and FIG. 1B illustrates another side plan view of the snowmobile 100 with several body panels and other components removed so that the interior of the snowmobile 100 may be viewed. Snowmobile 100 may include system 101 as described further below. The snowmobile 100 includes a frame 102, which may also be referred to as a "chassis" or "body", that provides a load bearing framework for the snowmobile 100. In the illustrated embodiment, the frame 102 includes a longitudinal tunnel 104, a mid-bay 106 (or "bulkhead") coupled forward of the tunnel 104, and a front sub-frame 108 (or "front brace") coupled forward of the mid-bay 106. In some implementations, the mid-bay 106 may form part of the front sub-frame 108.

The snowmobile 100 also includes a rear suspension assembly 110 and a front suspension assembly 112 to provide shock absorption and improve ride quality. The rear suspension assembly 110 may be coupled to the underside of the tunnel 104 to facilitate the transfer of loads between the rear suspension assembly 110 and the tunnel 104. The rear suspension assembly 110 supports a drive track 114 having the form of an endless belt for engaging the ground (e.g., snow) and propelling the snowmobile 100. The rear suspension assembly may include, inter alia, one or more rails and/or idler wheels for engaging with the drive track 114, and one or more control arms and damping elements (e.g., elastic elements such as coil and/or torsion springs forming a shock absorber) connecting the rails to the tunnel 104. The front suspension assembly 112 includes two suspension legs 116 coupled to the front sub-frame 108 and to respective ground engaging front skis 118 (only one suspension leg 116 and ski 118 are visible in FIGS. 1A and 1B). Each of the suspension legs 116 may include two A-frame arms connected to the front sub-frame 108, a damping element (e.g., an elastic element) connected to the front sub-frame 108, and a spindle connecting the A-frame arms and the damping element to a respective one of the skis 118. The suspension legs 116 transfer loads between the skis 118 and the front sub-frame 108. In the illustrated embodiment, the frame 102 also includes an over-structure 120 (shown in FIG. 1B), that may include multiple members (e.g., tubular members) interconnecting the tunnel 104, the mid-bay 106 and/or the front sub-frame 108 to provide additional rigidity to the frame 102. However, as discussed elsewhere herein, the over-structure 120 may be omitted in some embodiments.

The snowmobile 100 may move along a forward direction of travel 122 and a rearward direction of travel 124 (shown in FIG. 1A). The forward direction of travel 122 is the direction along which the snowmobile 100 travels in most instances when displacing. The rearward direction of travel 124 is the direction along which the snowmobile 100 displaces only occasionally, such as when it is reversing. The snowmobile 100 includes a front end 126 and a rear end 128 defined with respect to the forward direction of travel 122 and the rearward direction of travel 124. For example, the front end 126 is positioned ahead of the rear end 128 relative to the forward direction of travel 122. The snowmobile 100 defines a longitudinal center axis 130 that extends between the front end 126 and the rear end 128. Two opposing lateral sides of the snowmobile 100 are defined parallel to the center axis 130. The positional descriptors "front", "rear" and terms related thereto are used in the present disclosure to describe the relative position of components of the snowmobile 100. For example, if a first component of the snowmobile 100 is described herein as being in front of, or forward of, a second component, then the first component is closer to the front end 126 than the second component. Similarly, if a first component of the snowmobile 100 is described herein as being behind, or rearward of, a second component, then the first component is closer to the rear end 128 than the second component. The snowmobile 100 also includes a three-axes frame of reference that is displaceable with the snowmobile 100, where the Z-axis is parallel to the vertical direction, the X-axis is parallel to the center axis 130, and the Y-axis is parallel to the lateral direction.

The snowmobile 100 is configured to carry one or more riders, including a driver (sometimes referred to as an "operator") and optionally one or more passengers. In the illustrated example, the snowmobile 100 includes a straddle seat 140 to support the riders. Optionally, the straddle seat 140 includes a backrest 142. The operator of the snowmobile 100 may steer the snowmobile 100 using a steering mechanism 144 (e.g., handlebars), which are operatively connected to the skis 118 via a steering shaft 146 to control the direction of the skis 118. The tunnel 104 may also include or be coupled to footrests 148 (also referred to as "running boards"), namely left and right footrests each sized for receiving a foot of one or more riders sitting on the straddle seat 140.

Referring to FIG. 1B, the snowmobile 100 is electrically propelled by an electric powertrain 150. The powertrain 150 includes an electric battery 152 (also referred to as a "battery pack") and an electric motor 170. The battery 152 is electrically connected to the motor 170 to provide electric power to the motor 170. The motor 170, in turn, is drivingly coupled to the drive track 114 to propel the snowmobile 100 across the ground. In other embodiments, the snowmobile 100 may also or instead be propelled by a powertrain including an internal combustion engine. For example, the motor 170 may also or instead be an internal combustion engine.

The battery 152 may include a battery enclosure 158 that houses one or more battery modules 160. The battery enclosure 158 may support the battery modules 160 and protect the battery modules 160 from external impacts, water and/or other hazards or debris. Each battery module 160 may contain one or more battery cells, such as pouch cells, cylindrical cells and/or prismatic cells, for example. In some implementations, the battery cells are rechargeable lithium-ion battery cells. The battery 152 may also include other components to help facilitate and/or improve the operation of the battery 152, including sensors (e.g., feedback sensor(s) 198 shown in FIG. 2) such as temperature sensors to monitor the temperature of the battery cells, voltage sensors to measure the voltage of one or more battery cells, current sensors to implement column counting to infer the state of charge (SOC) of the battery 42, and/or thermal channels that circulate a thermal fluid to control the temperature of the battery cells. In some implementations, the battery 152 may output electric power at a voltage of between 300 and 800 volts, for example. The snowmobile 100 may also include a charger 162 to convert AC to DC current from an external power source to charge the battery 152. The charger 162 may include, or be connected to, a charging port positioned forward of the straddle seat 140 to connect to a charging cable from an external power source. In some implementations, the charging port is covered by one or more protective flaps (e.g., made of plastic and/or rubber) to protect the charging port from water, snow and other debris.

In some implementations, the battery 152 may be generally divided into a tunnel battery portion 154 and a mid-bay battery portion 156. The tunnel battery portion 154 may be positioned above and coupled to the tunnel 104. As illustrated, the straddle seat 140 is positioned above the tunnel battery portion 154 and, optionally, the straddle seat 140 may be supported by the battery enclosure 158 and/or internal structures within the battery 152. The mid-bay battery portion 156 extends into the mid-bay 106 and may be coupled to the mid-bay 106 and/or to the front sub-frame 108. The tunnel battery portion 154 and the mid-bay battery portion 156 may share a single battery enclosure 158, or alternatively separate battery enclosures. In the illustrated example, the tunnel battery portion 154 and the mid-bay battery portion 156 each include multiple battery modules 160 that are arranged in a row and/or stacked within the battery enclosure 158.

It should be noted that other shapes, sizes and configurations of the battery 152 are contemplated. For example, the battery 152 may include multiple batteries that are interconnected via electrical cables. In some embodiments, the battery enclosure 158 may be a structural component of the snowmobile 100 and may form part of the frame 102. For example, the battery enclosure 158 may be coupled to the front sub-frame 108 to transfer loads between the front sub-frame 108 and the tunnel 104. The battery enclosure 158 may be formed from a fiber composite material (e.g., a carbon fiber composite) for additional rigidity. Optionally, in the case that the battery enclosure 158 is a structural component of the snowmobile 100, the over-structure 120 may be omitted.

FIG. 1C is a perspective view of the mid-bay 106 of the snowmobile 100. As illustrated, the motor 170 is disposed in a lower portion of the mid-bay 106, below the mid-bay battery portion 156 and forward of a wall 164 defining a front end of the tunnel 104. The motor 170 may be mounted to a transmission plate 166 that is supported between the tunnel 104 and the front sub-frame 108 to help support the motor 170 within the mid-bay 106.

In the illustrated embodiment, the motor 170 is a permanent magnet synchronous motor having a rotor 172 and stator 173. The motor 170 also includes power electronics module 174 (sometimes referred to as an inverter) to convert the direct current (DC) power from the battery 152 to alternating current (AC) power having a desired voltage, current and waveform to drive the motor 170. In some implementations, the power electronics module 174 may include one or more capacitors to reduce the voltage variations between the high and low DC voltage leads, and one or more electric switches (e.g., insulated-gate bipolar transistors (IGBTs)) to generate the AC power. In some implementations, the motor 170 has a maximum output power of between 90 KW and 135 KW. In other implementations, the motor 170 has a maximum output power greater than 135 kW.

In some implementations, the motor 170 may include sensors (e.g., feedback sensor(s) 198) configured to sense one or more parameters of the motor 170. The sensors may be implemented in the rotor 172, the stator 173 and/or the power electronics module 174. The sensors may include a position sensor (e.g., an encoder or a resolver) to measure a position and/or rotational speed of the rotor 172, and/or a speed sensor (e.g., a revolution counter) to measure the rotational speed of the rotor 172. Alternatively or additionally, the sensors may include a torque sensor to measure an output torque from the motor 170 and/or a current sensor (e.g., a Hall effect sensor) to measure an output current from the power electronics module 174.

Other embodiments of the motor 170 are also contemplated. For example, the power electronics module 174 may be integrated into the housing or casing of motor 170, as shown in FIG. 1C. However, the power electronics module 174 may also, or instead, be provided externally to the housing or casing of motor 170. In some embodiments, the motor 170 may be a type other than a permanent magnet synchronous motor. For example, the motor 170 may instead be a brushless direct current motor.

The motor 170 may convert the electric power output from the battery 152 into motive power that is transferred to the drive track 114 via a drive transmission 178. The drive transmission 178 engages with a motor drive shaft 180 of the motor 170. The motor drive shaft 180 may extend laterally through an opening in the transmission plate 166. The drive transmission 178 includes a track drive shaft 182 that extends laterally across the tunnel 104. The motor drive shaft 180 and the track drive shaft 182 may extend parallel to each other along transverse axes of the snowmobile 100 and may be spaced apart from each other along the longitudinal axis 130. In the illustrated embodiment, the motor drive shaft 180 is operably coupled to the track drive shaft 182 via a drive belt 184. Sprockets on the motor drive shaft 180 and the track drive shaft 182 may engage with lugs on the drive belt 184. A drive belt idler pulley 186 may also be implemented to maintain tension on the drive belt 184. In other embodiments, another form of linkage such as a drive chain, for example, may operatively connect the motor drive shaft 180 and the track drive shaft 182.

In operation, torque from the motor 170 is transferred from the motor drive shaft 180 to the track drive shaft 182 via the drive belt 184. The track drive shaft 182 includes one or more sprockets (not shown) that engage with lugs on the drive track 114, thereby allowing the track drive shaft 182 to transfer motive power to the drive track 114. It will be understood that the motor 170 may be operated in two directions (i.e., rotate clockwise or counter-clockwise), allowing the snowmobile 100 to travel in the forward direction of travel 122 and in the rearward direction of travel 124. In some implementations, the drive track 114 and the snowmobile 100 may be slowed down via electrical braking (e.g., regenerative braking) implemented by the motor 170 and/or by a mechanical brake (e.g., a disc brake) connected to one of the track drive shaft 182 or the motor drive shaft 180.

The snowmobile 100 may include a heat exchanger 132 that is coupled to, or integrated with, the tunnel 104. The heat exchanger 132 may form part of a thermal management system to control the temperature of the battery 152, the motor 170 and the charger 162, for example. The heat exchanger may include channels to carry a thermal fluid along a portion of the tunnel 104. During operation of the snowmobile 100, the heat exchanger 132 may be exposed to snow and cold air circulating in the tunnel 104 that cools the thermal fluid. The thermal fluid may then be pumped through thermal channels in the battery 152, the motor 170 and/or the charger 162, for example, to cool those components. In some implementations, the thermal management system of the snowmobile 100 may also include a heater 168 (shown in FIG. 2B) to heat the thermal fluid and warm the battery 152. Warming the battery 152 may be useful if the snowmobile 100 has been left for an extended period in a cold environment. In such a case, the temperature of the battery cells in the battery modules 160 may fall to a level where high power is limited from being drawn from the battery 152. Warming the battery 152 may bring the battery cells back into an efficient operating regime. In some implementations, the heater 168 is disposed within the battery enclosure 158.

Referring again to FIG. 1B, one or more controllers 190 (referred to hereinafter in the singular) and an instrument panel 134 are part of a control system for controlling operation of the snowmobile 100. The instrument panel 134 allows an operator of the snowmobile 100 to generate user inputs and/or instructions for the snowmobile 100. The controller 190 is connected to the instrument panel 134 to receive the instructions therefrom and perform operations to implement those instructions. In the illustrated embodiment, the instrument panel 134 is provided on the steering mechanism 144 and the controller 190 is disposed within the interior of the snowmobile 100, but this need not always be the case. Instrument panel 134 may allow a desired operating mode 135 (shown in FIG. 2) such as the power-saving, normal or high-performance operating modes to be specified by the operator.

The snowmobile 100 includes an accelerator 136 (also referred to as a "throttle") to allow an operator to control the power generated by the powertrain 150. For example, the accelerator 136 may include a lever (shown in FIG. 6) to allow the operator to selectively generate a propulsion command PC (shown in FIG. 2) in the form of an accelerator signal. The controller 190 is operatively connected to the accelerator 136 and to the motor 170 to receive the accelerator signal and produce a corresponding output from the motor 170. In some implementations, the accelerator signal is mapped to a torque of the motor 170. When the controller 190 receives an accelerator signal from the accelerator 136, the controller 190 maps the accelerator signal to a torque of the motor 170 and controls the power electronics module 174 to produce that torque using feedback from sensors in the motor 50. The mapping of the accelerator signal to an output from the motor 170 may be based on the operating mode of the snowmobile 100 (e.g., whether the snowmobile 100 is in a power-saving mode, a normal mode or a high-performance mode). In some examples, the mapping of the accelerator signal to an output from the motor 170 may be based on current operating conditions of the powertrain 150 (e.g., temperature of the battery 152 and/or motor 170, state of charge of the battery 152, etc.). In still other examples, the mapping of the accelerator signal to an output from the motor 170 may be user configurable, such that a user may customize an accelerator position to motor output mapping.

In addition to the accelerator 36, the instrument panel 34 may include other user input devices (e.g., levers, buttons and/or switches) to control various other functionality of the snowmobile 100. These user input devices may be connected to the controller 190, which executes the instructions received from the user input devices. Non-limiting examples of such user input devices include a brake lever to implement mechanical and/or electrical braking of the snowmobile 100, a reverse option to propel the snowmobile 100 in the rearward direction of travel 124, a device to switch the snowmobile 100 between different vehicle states (e.g., "off", "neutral" and "drive" states), a device to switch the snowmobile 100 between different performance modes, a device to switch between regenerative braking modes (e.g. "off", "low" and "high" modes) and a device to activate heating of handgrips 147 of the steering mechanism. The snowmobile 100 also includes a display screen 138 connected to the controller 190. The display screen 138 may be provided forward of the steering mechanism 144, or in any other suitable location depending on the design of the snowmobile 100. The display screen 138 displays information pertaining to the snowmobile 100 to an operator. Non-limiting examples of such information include the current state of the snowmobile 100, the current performance mode of the snowmobile 100, the speed of the snowmobile 100, the state of charge (SOC) of the battery 152, the angular speed of the motor 170, and the power output from the motor 170. The display screen 138 may include a liquid crystal display (LCD) screen, thin-film-transistor (TFT) LCD screen, light-emitting diode (LED) or other suitable display device. In some embodiments, display screen 138 may be touch-sensitive to facilitate operator inputs.

The controller 190 may also control additional functionality of the snowmobile 100. For example, the controller 190 may control a battery management system (BMS) to monitor the SOC of the battery 152 and manage charging and discharging of the battery 152. In another example, the controller 190 may control a thermal management system to manage a temperature of the battery 152, the motor 170 and/or the charger 162 using a thermal fluid cooled by the heat exchanger 132 and/or heated by the heater 168. Temperature sensors in the battery 152 and/or the motor 170 may be connected to the controller 190 to monitor the temperature of these components.

The controller 190 includes one or more data processors 192 (referred hereinafter as "processor 192") and non-transitory machine-readable memory 194. The memory 194 may store machine-readable instructions which, when executed by the processor 192, cause the processor 192 to perform any computer-implemented method or process described herein. The processor 192 may include, for example, any type of general-purpose microprocessor or microcontroller, a digital signal processing (DSP) processor, an integrated circuit, an application-specific integrated circuit (ASIC), a field programmable gate array (FPGA), a reconfigurable processor, other suitably programmed or programmable logic circuits, or any combination thereof. The memory 194 may include any suitable machine-readable storage medium such as, for example, an electronic, magnetic, optical, electromagnetic, infrared, or semiconductor system, apparatus, or device, or any suitable combination thereof. The memory 194 may be located internally and/or externally to the controller 190.

Although the controller 190 is shown as a single component in FIG. 1B, this is only an example. In some implementations, the controller 190 may include multiple controllers distributed at various locations in the snowmobile 100. For example, the controller 190 may include a vehicle control unit (also referred to as a "body controller") that is responsible for interpreting the inputs from various other controllers in the snowmobile 100. Non-limiting examples of these other controllers include a motor controller that is part of the power electronics module 174 and a battery management controller that is part of the battery 152. Optionally, separate battery management controllers may be implemented in the each of the battery modules 160 to form a distributed battery management system.

Systems and methods are described and shown in the present disclosure in relation to the snowmobile 100, but the present disclosure may also be applied to other types of vehicles, including other types of off-road and powersport vehicles.

FIG. 2 is an exemplary schematic representation of snowmobile 100 of FIG. 1. Powertrain 150 may include motor 170 to provide propulsive power to snowmobile 100, and battery 152 for providing electric power to motor 170. The operation of motor 170 may be controlled by controller 190 based on an actuation of accelerator 136 by the operator. Motor 170 may be drivingly connected to drive track 114 via suitable motive power transmission means. The operation of motor 170 and the delivery of electric power to motor 170 may be controlled by controller 190 via output(s) 196 (e.g., signals) and power electronics module 174.

One or more feedback sensors 198 may be operatively connected to component(s) of powertrain 150 and configured to sense one or more parameters 200 of powertrain 150. Controller 190, via the control of power electronics module 174 and using feedback from feedback sensor(s) 198, may control the amount of motive power that may be output from powertrain 150 during propulsion of snowmobile 100. Parameters 200 acquired via feedback sensor(s) 198 may be received at controller 190 and used by controller 190 in one or more procedures or steps defined by machine-readable instructions 202 stored in memory 194 and executable by processor 192.

In some embodiments, snowmobile 100 may include one or more condition sensors 204 that may be used to sense one or more operating conditions 206 in which snowmobile 100 is currently operating. Alternatively or in addition, operating condition 206 may be sensed using feedback sensor 198 and/or determined indirectly from one or more parameters 200 acquired using feedback sensor 198. In various embodiments, operating condition 206 may be determined based on information acquired via feedback sensor 198 and/or based on information acquired via condition sensor 204. Operating condition(s) 206 may be sensed and/or determined substantially in real-time and used by controller 190 to select suitable condition-dependent (e.g., adaptive) performance characteristics 208 (e.g., speed thresholds, magnitudes of the temporary power boost) for controlling the behaviour of snowmobile 100 and promoting a safe operation of snowmobile 100. Condition-dependent performance characteristics 208 may be stored in memory 194 and have the form of a look-up table for example.

In some embodiments, condition sensor(s) 204 may include a satellite navigation device such as a global positioning system (GPS) receiver, operatively connected to controller 190. Such GPS receiver may be capable of receiving (sensing) information from global navigation satellite systems (GNSS) satellites that may be used to calculate a geographical position of vehicle 10, and/or be used to calculate an estimated actual (i.e., GPS) speed of snowmobile 100. In some embodiments, condition sensor(s) 204 may include a gyroscope and/or an accelerometer. In some embodiments, condition sensor(s) 204 may include a load cell configured to measure a payload carried by snowmobile 100.

In some embodiments, operating condition(s) 206 may be indicative of a total resistive force opposing propulsion of snowmobile 100. Operating condition(s) 206 may be indicative of an actual situation in which snowmobile 100 is currently operating. For example, operating condition(s) 206 may be indicative of an environmental condition (e.g., type and/or inclination of terrain) in which snowmobile 100 is operating. In some embodiments, a greater temporary power boost may be permitted when snowmobile 100 is subjected to a larger resistive force opposing propulsion and/or carrying a larger payload, and a smaller temporary power boost may be permitted when snowmobile 100 is subjected to a smaller resistive force opposing propulsion and/or carrying a smaller payload for example.

The total resistive force may include a combination (e.g., sum) of forces acting against the movement of snowmobile 100 and may be estimated by controller 190 based on data acquired via feedback sensor(s) 198 and/or via condition sensor(s) 204. In various embodiments, controller 190 may be configured to estimate the total resistive force so that an appropriate magnitude and/or duration of the power boost may be selected accordingly. For example, controller 190 may be configured to determine a value indicative of a specific magnitude of the total resistive force, or may be configured to determine a relative value indicative of whether the total resistive force is high or low for example. In some embodiments, an indication of the total resistive force may be determined using a rate of consumption of the energy stored in battery 152 so that a high rate of consumption during propulsion of snowmobile 100 is indicative of a high total resistive force and a low rate of consumption during propulsion of snowmobile 100 is indicative of a low total resistive force. In some embodiments, the indication of the total resistive force may be determined using the rate of consumption of the energy stored in battery 152 with respect to the distance travelled by snowmobile 100 (e.g., kW*hours/km). In some embodiments, the indication of the total resistive force may be determined using a ratio of an output (e.g., velocity, acceleration) of snowmobile 100 to an input power (e.g., current) being drawn by motor 170. In some embodiments, the indication of the total resistive force may be determined using a ratio of an output (e.g., velocity, acceleration) of snowmobile 100 to an output torque being generated by motor 170 (e.g., determined based on the current being drawn by motor 170).

The total resistive force may be a sum of the forces acting against the movement of snowmobile 100 at a given time. In some embodiments, four main resistive forces considered as acting on snowmobile 100 may be rolling resistance, aerodynamic drag, gravitational forces and frictional forces within the drivetrain components of snowmobile 100. In various vehicles, the drivetrain components may include tires, tracks, gears, belts, chains and wheels for example.

The rolling resistance for snowmobile 100 may be analogous to a rolling resistance for the tires of a wheeled vehicle. Rolling resistance may include the friction between skis 118 and the ground and rolling resistance from track 114 rolling on the ground. In some implementations, the rolling resistance may be dependent on snow and/or trail conditions, and on vehicle speed relative to the ground.

The aerodynamic drag force acting on snowmobile 100 may be based on fluid dynamic drag equations using known drag coefficients associated with snowmobile 100, and may depend on the shape and size of snowmobile 100, on the actual (e.g., GPS) speed of snowmobile 100 and also on the wind speed and direction.

The drivetrain frictional forces may be internal to the drivetrain of snowmobile 100 and may depend on a rotational speed of motor 170.

The gravitational force acting on snowmobile 100 may be due to an inclination (i.e., slope angle) of snowmobile 100 and gravitational acceleration of snowmobile 100. An accelerometer of snowmobile 100 may be used to measure an acceleration or deceleration of snowmobile 100. A gyroscope of snowmobile 100 may be used to measure an inclination of snowmobile 100 so that a contribution to the total resistive force from the gravitational force may be determined in some embodiments.

Slippage may also influence the total resistance force due to lack of traction between track 114 and the ground. Deep snow, loose snow and/or icy conditions may contribute to a loss of traction, which impedes propulsion of snowmobile 100. In some implementations, slippage may be partially overcome by increasing the speed of the track 114 (and the speed of motor 170) to compensate for the loss of traction.

The estimate or indication of the total resistive force can be used to determine an expected acceleration of snowmobile 100 for an increase (i.e., boost) in propulsive force provided by a torque output of motor 170 by rearranging the equation: propulsive force−total resistive force=mass*acceleration for example. The propulsive force may be determined (estimated) from a torque output of motor 170 or from a magnitude of the electric current being drawn by motor 170. For example, controller 190 may have access to a look-up table defining a relationship between the current being drawn by motor 170 and the corresponding propulsive force. The mass may be the total mass of snowmobile 100 including the payload carried by snowmobile 100. Alternatively or in addition, controller 190 may have access to a look-up table defining a relationship between the total resistive force and corresponding characteristics (e.g., magnitudes and durations) of power boosts so that a suitable power boost may be selected based on the applicable operations conditions 206.

Operating mode performance characteristics 210 may also be stored in memory 194 for use by controller 190 depending on which operating mode 135 has been selected by the operator. Controller 190 may use operating mode performance characteristics 210 to control the behaviour of snowmobile 100 in accordance with the selected operating mode 135.

Figure 3:
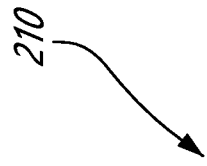
FIG. 3 is an exemplary data structure defining performance characteristics of the snowmobile of FIG. 1 associated with different operating modes of the snowmobile of FIG. 1.

FIG. 3 is an exemplary data structure defining operating mode performance characteristics 210 associated with different operating modes of snowmobile 100. In some embodiments, operating mode performance characteristics 210 may be stored in memory 194 in the form of a look-up table for example. Operating mode performance characteristics 210 may include factory-defined sets of operating parameters for snowmobile 100. Alternatively, or additionally, operating mode performance characteristics 210 may include user-defined sets of operating parameters. Such operating mode performance characteristics 210 may define restricted speed values RS1-RS3 and/or restricted power output values RPO1-RPO3 as shown in FIGS. 3 and 7B, and which may be implemented by controller 190. Restricted speed values RS1-RS3 may be maximum (e.g., GPS or track) speed limits associated with the respective operating modes. Similarly, restricted power output values RPO1-RPO3 may be maximum power output limits normally available from powertrain 150 for propelling snowmobile 100 when operating under the respective operating modes. Operating mode performance characteristics 210 may include other performance characteristics and/or restrictions such as acceleration limits, torque output limits, torque curves (e.g., torque ramp rates) associated with the actuation of accelerator 136, and power curves associated with the actuation of accelerator 136 for different operating modes 135 for example.

For example, the power-saving operating mode may define restricted (i.e., maximum) speed RS1, and restricted (i.e., maximum) power output RPO1, which would normally not be exceeded while snowmobile 100 is operated in the power-saving mode. The normal operating mode may define restricted (i.e., maximum) speed RS2, and restricted (i.e., maximum) power output RPO2, which would normally not be exceeded while snowmobile 100 is operated in the normal operating mode. Restricted speed RS2 may be greater than restricted speed RS1. Similarly, restricted power output RPO2 may be greater than restricted power output RPO1. The high-performance operating mode may define restricted (i.e., maximum) speed RS3, and restricted (i.e., maximum) power output RPO3, which would normally not be exceeded while snowmobile 100 is operated in the high-performance operating mode. Restricted speed RS3 may be greater than restricted speed RS2. Similarly, restricted power output RPO3 may be greater than restricted power output RPO2. In some embodiments, restricted speed RS3 and restricted power output RPO3 may correspond to a maximum speed available from snowmobile 100 and to a maximum power output available from powertrain 150 of snowmobile 100. In other words, the normal operating mode may be less-restrictive than the power-saving mode, and the high-performance mode may be less restrictive than the normal operating mode.

In some embodiments, restricted speed values RS1, RS2 and RS3 may be expected (e.g., steady-state) speeds of snowmobile 100 when powertrain 150 of snowmobile 100 is being operated to generate the restricted power output values RPO1, RPO2 and RPO3, respectively, and when snowmobile 100 is being operated under typical (i.e. baseline) operating conditions.

In some embodiments, operating mode performance characteristics 210 may include a single restricted speed value for two or more of the operating modes. For example, restricted speed value RS3 may be implemented for the power-saving, normal and high-performance modes. However, under typical operating conditions, snowmobile 100 might not have access to sufficient power output to achieve the restricted speed value RS3 in the power-saving and normal operating modes due to the restricted power output values RPO1, RPO2. In this way, the restricted power output values RPO1, RPO2 may help limit speed of snowmobile 100. In other embodiments, operating mode performance characteristics 210 may include one restricted power output value for two or more of the operating modes. For example, restricted power output value RPO3 may be implemented for the power-saving, normal and high-performance modes, and the restricted speed values RS1, RS2 may be primarily used to restrict vehicle performance in the power-saving and normal modes.

FIG. 4 is a flow diagram of an exemplary method 1000 of operating an electric vehicle such as snowmobile 100. Method 1000 may include other actions, or may be combined with other methods or actions disclosed herein. Method 1000 may be carried out using system 101 or another system, and optionally using elements of snowmobile 100. Functions and other aspects of snowmobile 100 may be incorporated into method 1000. Method 1000 may be computer-implemented. In various embodiments, method 1000 may include:

receiving restricted mode command 1002 to operate snowmobile 100 in a restricted (e.g., battery-saving or normal) operating mode defining restricted power output 1004 from powertrain 150 of snowmobile 100, restricted power output 1004 being lower than a maximum power output available from powertrain 150 of snowmobile 100;

when snowmobile 100 is the restricted operating mode, receiving operator propulsion command 137 from an operator of snowmobile 100, operator propulsion command 137 being equal to or exceeding propulsion command threshold (block 1006);

commanding powertrain 150 of snowmobile 100 to generate a first power output corresponding to operator propulsion command 137, the first power output being lower than or equal to the restricted power output 1004 (block 1008);

when powertrain 150 of snowmobile 100 is generating the first power output, measuring actual speed 1010 of snowmobile 100; and when operator propulsion command 137 is equal to or exceeding propulsion command threshold and actual speed 1010 of snowmobile 100 is below a speed threshold at decision block 1012, commanding powertrain 150 of snowmobile 100 to generate a second power output exceeding restricted power output 1004 in response to operator propulsion command 137 (block 1014).

The second power output exceeding restricted power output 1004 may be a power boost that is generated by powertrain 150 only temporarily while snowmobile 100 remains in the restricted operating mode (i.e., without requiring switching to a less-restrictive operating mode). For example, the second power output may be generated only when actual speed 1010 of snowmobile 100 is below the speed threshold as determined at decision block 1012. Optionally, powertrain 150 may slowly or gradually increase the first power output to the second power output at block 1014 to avoid an abrupt change in power that may surprise an operator.

In some embodiments, actual speed 1010 may be a GPS speed of snowmobile 100 determined using the GPS receiver. In some embodiments, actual speed 1010 may be determined based on an operating speed of drive track 114 or other ground-engaging member. Such operating speed may be based on a rotational speed of motor 170 and/or other drivetrain component of snowmobile 100.

In some embodiments, the speed threshold may be equal to the restricted speed (e.g., RS1 or RS2) that is applicable to the selected restricted (e.g., power-saving or normal) operating mode, or may be another speed that is lower than the applicable restricted speed. For example, the speed threshold for the selected operating mode may be a fraction or percentage (e.g., 50%, 60%, 70%, 80%, 90%, 95%) of the restricted speed for that operating mode. The threshold speed might also or instead be a fixed speed for two or more of the operating modes.

In some embodiments, the restricted speed and the speed threshold might correspond to different measurements of speed. For example, restricted speed may correspond to a speed of motor 170 to ensure safe and/or efficient operation of powertrain 150. The speed threshold, on the other hand, might correspond to an actual ground speed (e.g., GPS speed) that reflects the true speed of snowmobile 100. In this way, the speed threshold may account for slippage of track 114 and other effects.

In some embodiments, the speed threshold may be an operating condition-dependent speed threshold. In some embodiments, the speed threshold may correspond to an expected (e.g., steady-state) speed of snowmobile 100 when powertrain 150 of snowmobile 100 is operated to generate the restricted power output 1004 and when snowmobile 100 is being operated under typical (i.e. baseline) operating conditions.

In some embodiments, block 1014 may be performed for a minimum or predefined period of time (e.g., 5 seconds, 10 seconds, 15 seconds, 30 seconds, 1 minute). For example, when the conditions for a power boost are met and method 1000 proceeds to block 1014, an operator may have access to the second power output for at least a predefined time to potentially allow the operator to traverse an area of challenging terrain. In some cases, providing an operator with a sustained power boost may avoid having to initiate multiple power boosts. For example, once the second power output allows snowmobile 100 to achieve the threshold speed, ceasing the power boost thereafter may cause the snowmobile 100 to fall below the threshold speed once again if snowmobile 100 is still in challenging conditions. This may initiate another power boost to allow snowmobile 100 to accelerate back to the threshold speed. Providing a sustained power boost for a predefined time may allow snowmobile 100 to traverse challenging conditions without the need for multiple power boosts.

In some embodiments, when the second power output is generated and snowmobile 100 accelerates to the speed threshold, the second power output may be controlled (i.e., actively adjusted) to inhibit snowmobile 100 from exceeding the speed threshold. In this way, block 1014 may include a form of speed control to maintain snowmobile 100 at or near the speed threshold. For example, the second power output might not be a fixed power output, but may be a variable power output that is controlled to achieve the speed threshold. Speed control may be performed using proportional-integral-derivative (PID) control for example. Speed control may be maintained until the power output to reach the speed threshold is less than or equal to the restricted power output and/or may be maintained until a minimum or predefined period of time has passed. In some implementations, speed control may be implemented by the feedback path shown from block 1014 to block 1012 in FIG. 4. For example, the second power output may be incrementally increased to reach the threshold speed using this feedback path.

The execution of the power boost may also be ceased once the operator propulsion command 137 no longer meets or exceeds the propulsion command threshold at block 1006. For example, when operator propulsion command 137 changes to being lower than the propulsion command threshold, powertrain 150 may then be commanded to generate a third power output corresponding to the new operator propulsion command and being lower than the restricted power output 1004.

In some embodiments, method 1000 may include one or more persistence criteria in one or more parts of method 1000. For example, a persistence criterion may be associated with operator propulsion command 137 meeting or exceeding the propulsion command threshold so that the execution of block 1014, where powertrain 150 is commanded to generate the second power output exceeding restricted power output 1004, may be conditioned upon operator propulsion command 137 meeting or exceeding the propulsion command threshold for a first prescribed duration. In various embodiments, such first prescribed duration may be between 1 and 30 seconds and may be stored in memory 194. The use of this persistence criterion may prevent an unexpected power boost in the event of an inadvertent and momentary actuation of accelerator 136 to or beyond threshold accelerator position AP2 (e.g., shown in FIG. 6), for example.

Another persistence criterion may be associated with block 1012. For example, commanding powertrain 150 of snowmobile 100 to generate the second power output exceeding restricted power output 1004 at block 1014 may be conditioned upon actual speed 1010 of snowmobile 100 being below the speed threshold for a second prescribed duration. In various embodiments, such second prescribed duration may be between 1 and 30 seconds and may be stored in memory 194. The use of this persistence criterion may prevent an unexpected power boost in the event of a momentary decrease in actual speed 1010.

In some embodiments, the power boost provided by method 1000 may be temporary (i.e., time-limited) even if the condition(s) for the execution of block 1014 remain true. The power boost may be intended for the operator of snowmobile 100 to traverse challenging terrain over a relatively short distance. For example, in some embodiments, the power boost provided by method 1000 may be limited to a prescribed maximum duration of between 30 seconds and 5 minutes for example. In some embodiments, the output of the power boost may cease once the prescribed maximum duration has expired. If a subsequent power boost is required, the operator may request another power boost by providing a subsequent operator propulsion command 137 that meets or exceeds the propulsion command threshold at block 1006 to restart method 1000. In some embodiments, a minimum time duration may be required between two operator propulsion commands 137 that meet or exceed the propulsion command threshold in order for a subsequent power boost to be provided. In the event that the operator desires increased power for longer than the prescribed maximum duration, the operator may choose to change the operating mode of snowmobile 100 to a less restrictive mode of operation and expect an increased battery consumption.

In some embodiments, different (e.g., consecutive) operator propulsion commands 137 may be distinguished by corresponding to different actuation amounts of actuator 136 without a complete release of actuator 136 therebetween. In some embodiments, different operator propulsion commands 137 may be distinguished by the presence of a complete release of actuator 136 to unactuated accelerator position AP1 between two actuations of actuator 136.

The execution of the power boost may also be ceased once operator propulsion command 137 no longer meets or exceeds the propulsion command threshold at block 1006. For example, when operator propulsion command 137 changes to being lower than the propulsion command threshold or such new lower operator propulsion command 137 is received, powertrain 150 may then be commanded to generate a third power output corresponding to the lower operator propulsion command 137 and being lower than the restricted power output 1004.

Further aspects of method 1000 are described below in relation to the subsequent figures.

FIG. 5 is a flow diagram of an exemplary method 2000 of automatically switching to another (i.e., different and less-restrictive) operating mode in response to operator propulsion command 137 meeting or exceeding the propulsion command threshold at block 1006 of method 1000 for a prescribed maximum duration. Method 2000 may be integrated with method 1000.

As explained above, the power boost may be time-limited and the execution of the power boost may be automatically terminated by controller 190 once the prescribed maximum duration has been reached. However, the operator's request for the power boost for a longer period of time than the prescribed maximum duration may be indicative of a continued need for the increased power output. In some embodiments, method 2000 may monitor the duration of operator propulsion command 137 substantially continuously meeting or exceeding the propulsion command threshold (block 2002).

At decision block 2004, while the duration of operator propulsion command 137 being equal to or exceeding the propulsion command threshold is shorter than the prescribed maximum duration, method 2000 may cause snowmobile 100 to provide the temporary power boost but remain (i.e., resume operation) in the current restricted (e.g., power-saving) operating mode at block 2006 after the temporary boost is no longer commanded. However, if the duration of operator propulsion command 137 being equal to or exceeding the propulsion command threshold reaches or exceeds the prescribed maximum duration at decision block 2004, method 2000 may cause snowmobile 100 to automatically switch to a less restrictive operating mode to keep providing the increased power output for longer than the prescribed maximum duration. For example, if snowmobile 100 is in the power-saving mode, block 2008 may cause snowmobile 100 to automatically switch to the normal operating mode or to the high-performance operating mode so that the increased power output may be maintained. If snowmobile 100 is in the normal operating mode, block 2008 may cause snowmobile 100 to automatically switch to the high-performance operating mode. The automatic switch to the less-restrictive operating mode may allow the duration of the power boost to be extended beyond the prescribed maximum duration in a seamless manner to assist the operator with traversing challenging terrain for example.

The switch to the less-restrictive operating mode may allow snowmobile 100 to be operated using the performance characteristics associated with the less-restrictive operating mode. For example, restricted power output 1004 (e.g., RPO1 or RPO2) associated with the previous restricted operating mode may then be freely exceeded. Similarly, the restricted speed (e.g., RS1 or RS2) associated with the previous restricted operating mode may then be freely exceeded. After the automatic switch to the less-restrictive operating mode, snowmobile 100 may remain in the less-restrictive operating mode even after ceasing to receive operator propulsion command 137 that is beyond the propulsion command threshold. Accordingly, subsequent operator propulsion commands 137 may be executed by controller 190 in accordance with the performance characteristics associated with the less-restrictive operating mode.

The switch to the less-restrictive operating mode may be permanent but reversible by intervention of the operator. For example, after the automatic switching to the less-restrictive operating mode and having finished traversing some challenging terrain in the less-restrictive operating mode, operator may provide a manual input via instrument panel 134 to instruct controller 190 to revert back to the restricted operating mode to resume the benefit of reduced power consumption for the following portion of the trip.

FIG. 6 is a perspective view of part of handlebar 145, which may be part of steering mechanism 144 of snowmobile 100. Accelerator 136 may be mounted to handlebar 145 adjacent handgrip 147. Accelerator 136 may be a hand- (e.g., thumb-) actuated lever pivotable about axis A. Accelerator 136 may be resiliently biased toward an unactuated accelerator position AP1 as shown in FIG. 6. Accelerator 136 may be actuated to a threshold accelerator position AP2, which may be a prescribed actuation amount corresponding to the threshold propulsion command referenced in block 1006 of FIG. 4. Accelerator 136 may be actuated to a maximum accelerator position AP3 corresponding to a maximum propulsion command that may be received from the operator. In some embodiments, operator propulsion command 137 may be expressed as a percentage of actuation of accelerator 136. For example, unactuated accelerator position AP1 may correspond to operator propulsion command 137 of 0% (nil) where no propulsion of snowmobile 100 is being commanded by the operator. Maximum accelerator position AP3 may correspond to operator propulsion command 137 of 100% (i.e., fully actuated) where a maximum propulsion (e.g., acceleration, speed) of snowmobile 100 is being commanded by the operator. In some embodiments, threshold accelerator position AP2 may correspond to maximum accelerator position AP3 so that AP2=AP3. Alternatively, threshold accelerator position AP2 may be disposed between unactuated accelerator position AP1 and maximum accelerator position AP3 so that AP1<AP2<AP3. In various embodiments, threshold accelerator position AP2 may correspond to between 95% and 100% of the full actuation of accelerator 136.

In reference to method 1000, commanding of the second power output greater than restricted power output 1004 in block 1014 may be conditioned upon accelerator 136 being actuated to or beyond threshold accelerator position AP2. In other words, commanding of the second power output may be ceased when accelerator 136 is actuated by less than threshold accelerator position AP2. In embodiments where AP2=AP3, commanding of the second power output may be conditioned upon accelerator 136 being fully actuated so that commanding of the second power output may be ceased when accelerator 136 is actuated to less than maximum accelerator position AP3.

Figure 7A:
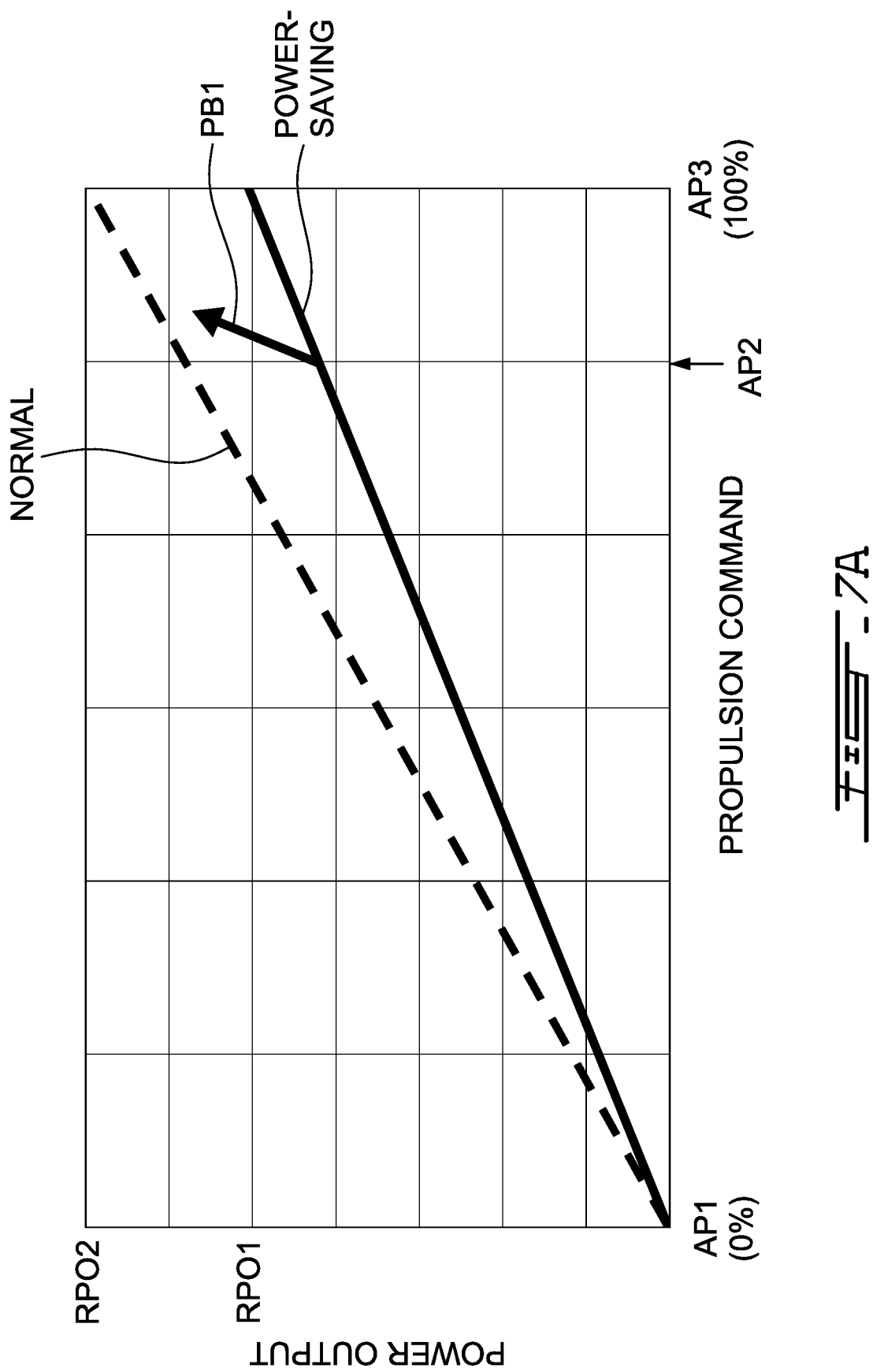
FIG. 7A is a plot of an exemplary power output as a function of propulsion command for the snowmobile of FIG. 1.
Figure 7B:
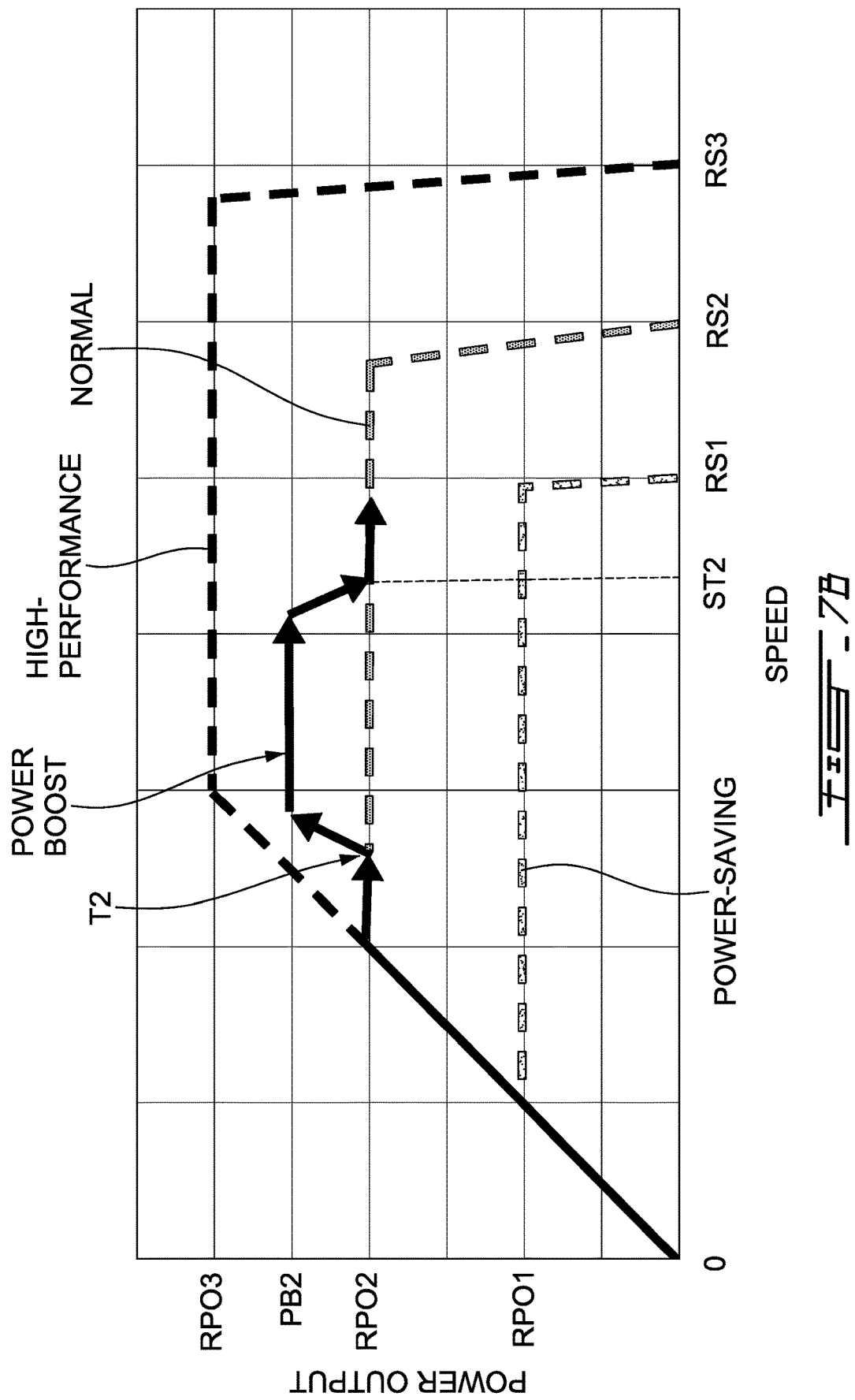
FIG. 7B are plots of exemplary power outputs of different operating modes of the snowmobile of FIG. 1 as a function of speed showing an exemplary power boost when the propulsion command is equal to or greater than a propulsion command threshold.

FIG. 7A is a plot of exemplary power output from powertrain 150 of snowmobile 100 as a function of operator propulsion command 137 received via accelerator 136. FIG. 7A shows POWER-SAVING line corresponding to a performance characteristic of snowmobile 100 associated with the current power-saving operating mode. The POWER-SAVING line may define restricted power output RPO1 at maximum accelerator position AP3. FIG. 7A shows NORMAL line corresponding to a performance characteristic of snowmobile 100 associated with the less-restrictive normal operating mode. The NORMAL line may define restricted power output RPO2 at maximum accelerator position AP3. The POWER-SAVING line and the NORMAL line may be linear or non-linear. In some implementations, the POWER-SAVING line and the NORMAL line may be dependent on motor speed. For example, changing the speed of motor 170 may change the slope of the POWER-SAVING line and the NORMAL line and/or may change the values of restricted power outputs RPO1, RPO2.

In reference to method 1000, commanding of the second power output greater than restricted power output 1004 in block 1014 may be represented in FIG. 7A by power boost PB1 represented as a segment deviating upwardly from POWER-SAVING line toward NORMAL line in the region of the plot where operator propulsion command 137 is greater than threshold accelerator position AP2. The activation of power boost PB1 may be conditional upon one or more persistence criteria as explained above. In some embodiments, power boost PB1 may include a temporary transition from the POWER-SAVING line to the NORMAL line. In various embodiments, power boost PB1 may extend beyond the NORMAL line, or may remain below the NORMAL line.

FIG. 7B are plots of exemplary power outputs associated with different operating modes (i.e., power-saving, normal and high-performance) of snowmobile 100 as a function of speed (e.g., actual speed or motor speed) of snowmobile 100 showing an exemplary power boost when operator propulsion command 137 is greater than threshold accelerator position AP2. The plots represent typical power outputs associated with the maximum accelerator position AP3 as a function of speed for each operating mode. For example, the power-saving operating mode may have restricted power output RPO1 and restricted speed RS1 associated therewith. The normal operating mode may have restricted power output RPO2 and restricted speed RS2 associated therewith. Similarly, the high-performance operating mode may have restricted power output RPO3 and restricted speed RS3 associated therewith. While restricted speeds RS1, RS2 and RS3 are shown at different values in FIG. 7B, in some embodiments, restricted speeds RS1, RS2 and RS3 may have the same value.

In the exemplary scenario depicted in FIG. 7B, the normal operating mode is currently active and operator propulsion command 137 has been at maximum accelerator position AP3 until time T2 where power boost PB2 is activated. The magnitude of power boost PB2 may be selected based on one or more operating conditions 206 as explained herein, or may be a fixed power boost value associated with the normal operating mode. In some embodiments, the duration of power boost PB2 may be dictated by speed threshold value ST2 so that power boost PB2 may be maintained while speed threshold value ST2 is not exceeded. In other words, power boost PB2 may be reduced and/or terminated to hinder snowmobile 100 from exceeding speed threshold value ST2 during power boost PB2. Once power boost PB2 is terminated due to speed threshold value ST2 being met, the operation of snowmobile 100 may then resume along the plot of the normal operating mode and be limited to restricted power output RPO2 and to restricted speed RS2 if the operator propulsion command 137 continues to be at maximum accelerator position AP3.

Once power boost PB2 is terminated, operation of snowmobile 100 may automatically resume under the currently active operating mode. For example, snowmobile 100 may remain in the normal operating mode. Accordingly, in response to receiving a subsequent operator propulsion command 137 lower than threshold accelerator position AP2, powertrain 150 of snowmobile 100 may be commanded to generate a power output corresponding to the subsequent operator propulsion command and lower than restricted power output RPO2.

In the example shown in FIG. 7B, speed threshold value ST2 is selected to be lower than restricted speed RS2 associated with the normal operating mode. However, in some embodiments, speed threshold value ST2 may be equal to restricted speed RS2. Speed threshold value ST2 may be a fixed (non-variable) value associated with the normal operating mode. Alternatively, speed threshold value ST2 may be a variable value selected based on operating conditions 206.

Figure 8:
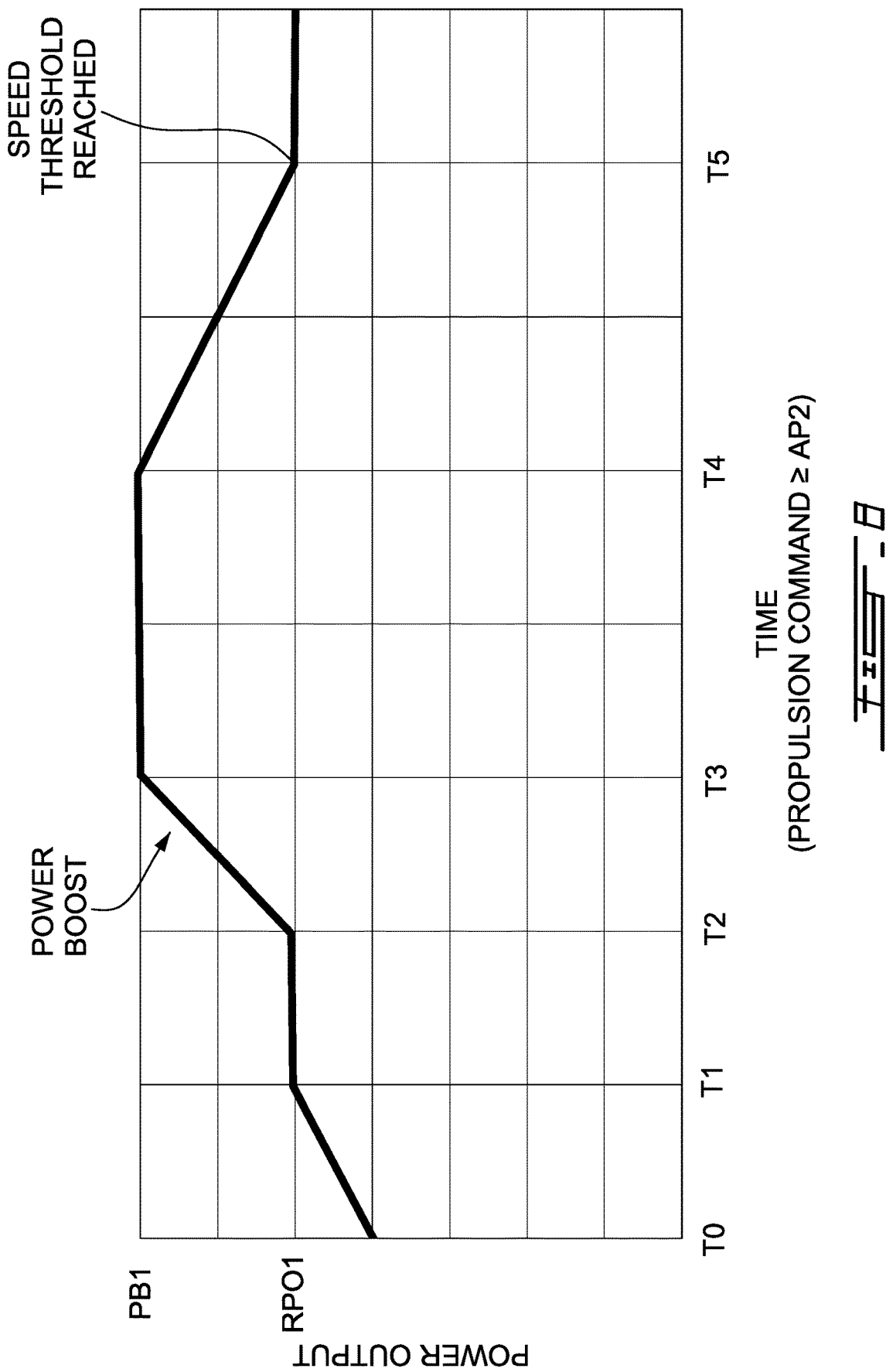
FIG. 8 is a plot of exemplary power output as a function of time showing an exemplary power boost provided when the propulsion command is equal to or greater than a propulsion command threshold.

FIG. 8 is a plot of exemplary power output as a function of time when operator propulsion command 137 is equal to or greater than the propulsion command threshold to request the power boost (e.g., when accelerator 136 is actuated at least to threshold accelerator position AP2). At time T0, accelerator 136 may reach or exceed threshold accelerator position AP2 and controller 190 may cause the power output from powertrain 150 to gradually increase to reach restricted power output RPO1 associated with the power-saving operating mode that is currently active. Once restricted power output RPO1 has been reached at time T1 and operator propulsion command 137 is still equal to or greater than the propulsion command threshold, the power output may optionally dwell at restricted power output RPO1 until time T2 to satisfy a persistence criterion before initiating the power boost at time T2. Alternatively, the power output may be increased beyond restricted power output RPO1 substantially immediately to initiate the power boost at time T1 without delay. At time T3, a higher restricted power output PB1 may be reached by powertrain 150 to provide the temporary power boost requested by the operator while snowmobile 100 remains in the restricted operating mode. During the power boost, snowmobile 100 may accelerate and, as the actual speed 1010 of snowmobile 100 approaches the threshold speed referenced in decision block 1012 of FIG. 4, the actual power output from powertrain 150 may be controlled (i.e., reduced) between times T4 and T5 so that the speed threshold is not exceeded during the power boost PB1. In various other examples, snowmobile 100 may produce power boost PB1 from powertrain 150 until the speed threshold is reached, which might cause a temporary overshoot of the speed threshold. Once the speed threshold is reached at time T5, the generation of the power boost may be ceased so that operation of snowmobile 100 under the restricted operating mode may be resumed. In reference to FIG. 8, the power boost may take place between times T2 and T5.

In some embodiments, the power boost may be ceased even if the speed threshold has not been reached and even if operator propulsion command 137 is still at of beyond the propulsion command threshold. For example, the duration of the power boost may be limited to a third prescribed duration and the power boost may be automatically terminated once the third prescribed duration has expired.

FIG. 9 is a flow diagram of an exemplary method 3000 of determining an allowable power boost 3002 beyond a restricted output power and a speed threshold 3004 based on one or more operating conditions 206 of snowmobile 100. Method 3000 may be integrated with method 1000 to determine a suitable condition-dependent speed threshold used at block 1012 of method 1000 and/or to determine a suitable condition-dependent power boost used at block 1014 of FIG. 4. Operating condition(s) 206 may be indicative of a partial or total resistive force opposing propulsion of snowmobile 100 as described above. Operating condition (s) 206 may be indicative of an actual situation in which snowmobile 100 is currently operating. In some embodiments, a greater temporary power boost may be selected when snowmobile 100 is subjected to a larger resistive force opposing propulsion (and/or carrying a larger payload), and a smaller temporary power boost may be selected when snowmobile 100 is subjected to a smaller resistive force opposing propulsion (and/or carrying a smaller payload) for example. Similarly, in some embodiments, a lower speed threshold may be selected when snowmobile 100 is subjected to a larger resistive force opposing propulsion (and/or carrying a larger payload), and a higher speed threshold may be selected when snowmobile 100 is subjected to a smaller resistive force opposing propulsion (and/or carrying a smaller payload) for example.

FIG. 10 is an exemplary data structure defining condition-dependent performance characteristics 208 associated with different operating conditions 206 (e.g., having values C1-C3) of snowmobile 100. The speed threshold may be a single fixed (non-variable) value. However, in some embodiments, condition-dependent performance characteristics 208 including a plurality of speed threshold values and a plurality of power boost values may be stored in memory 194 in the form of a look-up table and used where applicable. Condition-dependent performance characteristics 208 may be used in the execution of method 3000. Condition-dependent performance characteristics 208 may define speed threshold values ST1-ST3 and power boost values PB1-PB3 (i.e., power output limits), and which may be implemented by controller 190. Condition-dependent performance characteristics 208 may include other performance characteristics and/or restrictions such as acceleration limits, torque output limits, torque curves associated with the actuation of accelerator 136, and power curves associated with the actuation of accelerator 136 for different operating conditions 206 of snowmobile 100 for example.

In some embodiments, the speed threshold values ST1-ST3 may be expected (e.g., steady-state, typical) speeds of snowmobile 100 when powertrain 150 of snowmobile 100 is being operated to generate the restricted power outputs RPO1, RPO2 and RPO3 respectively and when snowmobile 100 is being operated at the applicable operating conditions 206. Speed threshold values ST1-ST3 may be determined empirically and/or through simulation and modelling. Similarly, the allowable temporarily power boost values PB1-PB3 may estimated power output values suitable and/or typically desirable by operators for traversing challenging terrain when snowmobile 100 is being operated under the applicable operating conditions 206. Power boost values PB1-PB3 may be determined empirically and/or through simulation and modelling.

Operating condition(s) 206 may be indicative of an actual situation in which snowmobile 100 is currently operating and may be indicative of a resistive force opposing propulsion of snowmobile 100. Operating condition(s) 206 may be indicative of an environmental condition such as a payload carried by snowmobile 100 (e.g., sensed using a load cell) and/or an inclination of the terrain across which snowmobile 100 is travelling (e.g., sensed using a gyroscope for example). Accordingly, the speed threshold and/or power boost may be selected or adjusted based on the operating condition(s) 206 snowmobile 100.

In some embodiments, speed threshold values ST1-ST3 and/or power boost values PB1-PB3 may be fixed (non-variable) values. In some embodiments, one or more speed threshold values ST1-ST3 and/or one or more power boost values PB1-PB3 may be variable within the current driving session. For example, the speed threshold selected in method 1000 may corresponds to a (e.g., average, maximum) speed of snowmobile 100 achieved during the current driving session of snowmobile 100 and with powertrain 150 of snowmobile 100 generating not more than the applicable restricted power output associated with the current operating mode. The current driving session may be defined as the time period beginning when snowmobile 100 was initially driven since the last shutdown of snowmobile 100. The determination of such variable speed threshold values ST1-ST3 and/or power boost values PB1-PB3 may then be made based on the actual operating conditions such as payload and terrain conditions in which snowmobile 100 is being operated in the current driving session.

Figure 11A:
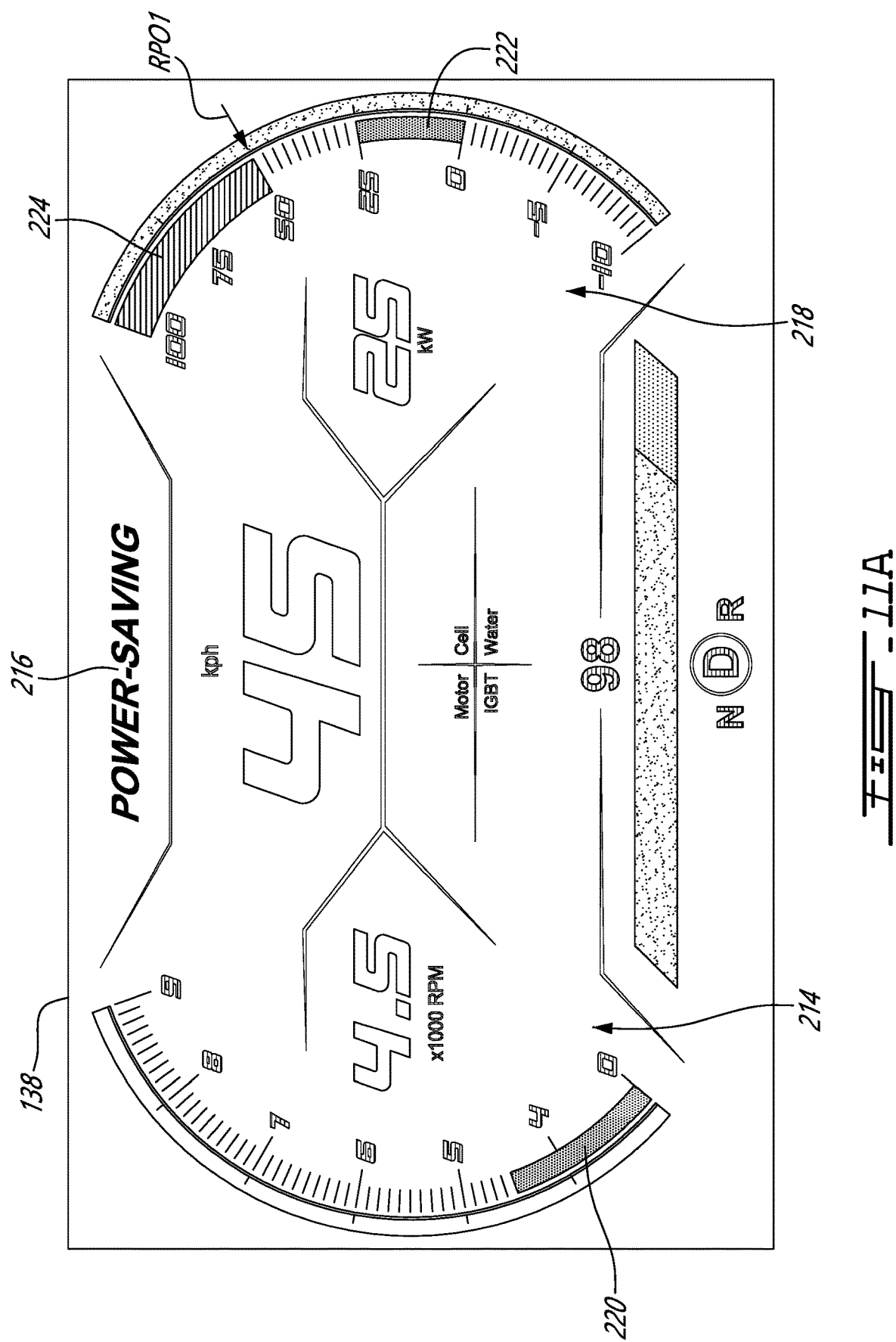
FIGS. 11A and 11B illustrate exemplary instances of a display screen of an instrument panel of the snowmobile of FIG. 1.
Figure 11B:
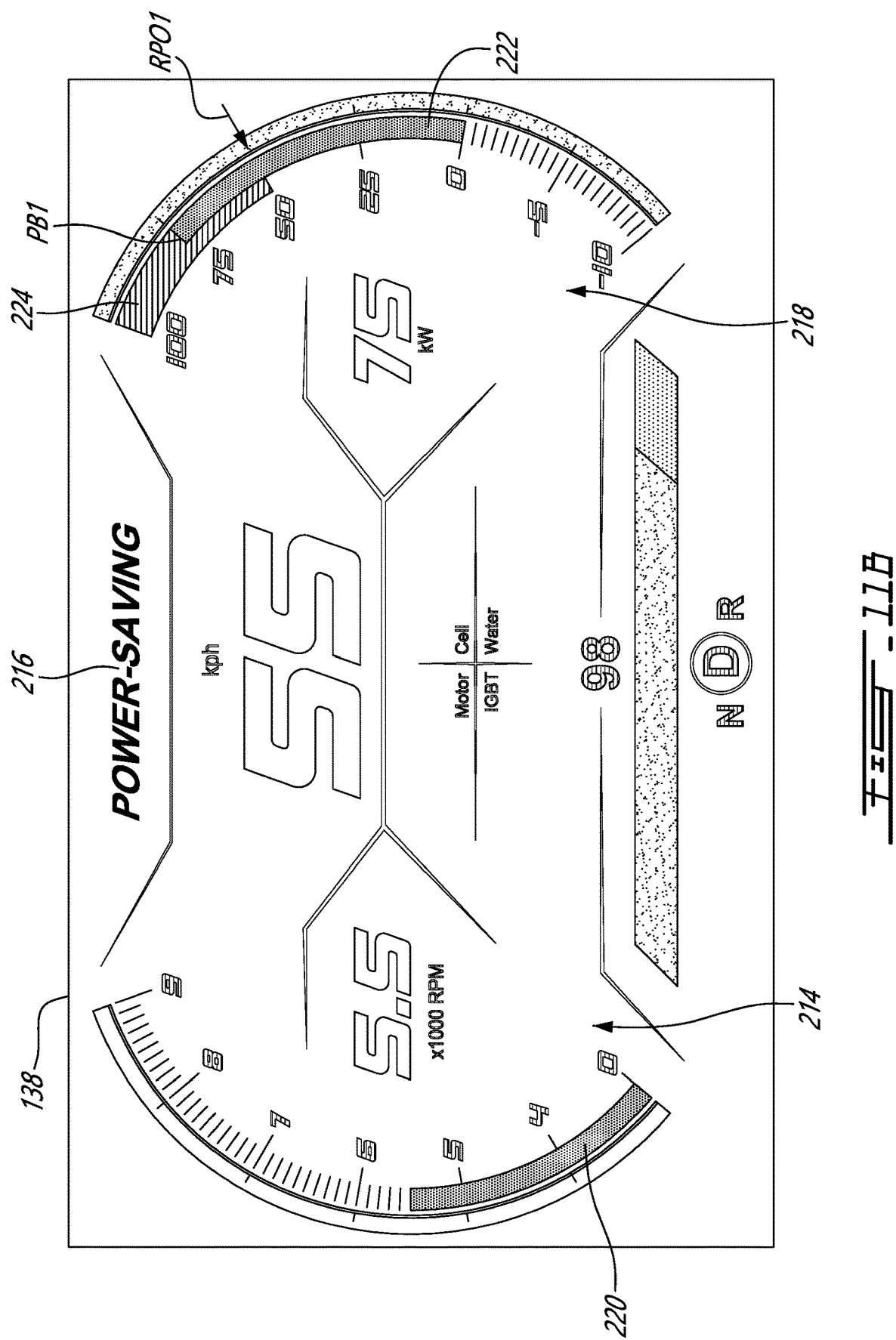

FIGS. 11A and 11B illustrate exemplary instances of display screen 138 of instrument panel 134 of snowmobile 100 showing exemplary tachometer 214, operating mode indicator 216 and power meter 218, which may be presented on display screen 138. Display screen 138 may be operatively connected to controller 190 and be controlled by controller 190. Tachometer 214 may dynamically and visually communicate to the operator a rotational operating speed of motor 170 substantially in real-time by way of band 220 extending from the 0 revolutions-per-minute (RPM) mark and along a scale of tachometer 214. Operating mode indicator 216 may communicate to the operator the current/active operating mode of snowmobile 100. Operating mode indicator 216 is shown as indicating the power-saving mode as being current as an example. In case of a transition to a different operating mode, operating mode indicator 216 may be updated accordingly to indicate the different operating mode. Power meter 218 may dynamically communicate to the operator the actual (i.e., current) power output of powertrain 150 substantially in real-time by way of band 222 extending from the 0 KW mark and along a scale of power meter 218.

In reference to FIG. 11A, power meter 218 may communicate to the operator the applicable restricted power output (e.g., RPO1) that is associated with the current (e.g., power-saving) operating mode by the indication of band 224. Band 224 may extend along the scale of power meter 218 from the restricted power output mark (e.g., 50 kW) to the maximum power output (e.g., 100 KW) available from powertrain 150 to graphically indicate that the region between 50 KW and 100 KW along the scale is normally not available in the power-saving operating mode, with the exception of a temporary power boost. Alternatively or in addition, the applicable restricted power output could be communicated to the operator by an arrow or other marker displayed at the appropriate location along the scale of power meter 218, and/or by a numerical value displayed on display screen 138 for example. Band 222 and band 224 may have different appearances (e.g., fill patterns, colours) to visually distinguish them from each other. FIG. 11A represents a situation where snowmobile 100 is being operated within the power-saving operating mode where the actual power output as indicated by band 222 is lower than restricted power output RPO1.

In reference to FIG. 11B, power meter 218 indicates a situation where a temporary power boost having a value of PB1 is being generated by powertrain 150 in accordance with method 1000. In the situation of FIG. 11B, the actual power output from the powertrain 150 as indicated by band 222 exceeds restricted power output RPO1 as shown by band 222 overlapping band 224 and also extending beyond restricted power output RPO1 along the scale of power meter 218. FIG. 11B also shows that even though the actual power output temporarily exceeds restricted power output RPO1, snowmobile 100 may remain in the power-saving operating mode as indicated by operating mode indicator 216.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A method of operating an electric vehicle, the method comprising:
   receiving a restricted mode command to operate the electric vehicle in a restricted operating mode defining a restricted power output from a powertrain of the electric vehicle, the restricted power output being lower than a maximum power output available from the powertrain of the electric vehicle;
   when the electric vehicle is in the restricted operating mode, receiving an operator propulsion command from an operator of the electric vehicle, the operator propulsion command being equal to or exceeding a propulsion command threshold;
   commanding the powertrain of the electric vehicle to generate a first power output corresponding to the operator propulsion command, the first power output being lower than or equal to the restricted power output;
   when the powertrain of the electric vehicle is generating the first power output, measuring an actual speed of the electric vehicle; and
   when the operator propulsion command is equal to or exceeding the propulsion command threshold, the actual speed of the electric vehicle is below a speed threshold and the electric vehicle is in the restricted operating mode, commanding the powertrain of the electric vehicle to generate a second power output exceeding the restricted power output in response to the operator propulsion command.

2. The method as defined in claim 1, wherein commanding the powertrain of the electric vehicle to generate the second power output comprises controlling the second power output to inhibit the electric vehicle from exceeding the speed threshold.

3. The method as defined in claim 2, wherein the speed threshold is equal to a restricted speed associated with the restricted operating mode.

4. The method as defined in claim 1, wherein commanding the powertrain of the electric vehicle to generate the second power output is conditioned upon the operator propulsion command being equal to or exceeding the propulsion command threshold for a first prescribed duration.

5. The method as defined in claim 4, wherein commanding the powertrain of the electric vehicle to generate the second power output is conditioned upon the actual speed being below the speed threshold for a second prescribed duration.

6. The method as defined in claim 1, wherein:
   the operator propulsion command is a first operator propulsion command; and
   the method includes:
      receiving a second operator propulsion command from an operator of the electric vehicle, the second operator propulsion command being lower than the propulsion command threshold;
      in response to the second operator propulsion command being lower than the propulsion command threshold:
         commanding the powertrain of the electric vehicle to generate a third power output corresponding to the second operator propulsion command, the third power output being lower than the restricted power output; and
         causing the electric vehicle to remain in the restricted operating mode.

7. The method as defined in claim 1, wherein commanding the powertrain of the electric vehicle to generate the second power output is conditioned upon the operator propulsion command including an accelerator of the electric vehicle being actuated at least to a prescribed actuation amount.

8. The method as defined in claim 7, wherein the prescribed actuation amount is equal to or greater than 95% of a full actuation of the accelerator.

9. The method as defined in claim 1, wherein the actual speed of the electric vehicle is a global positioning system (GPS) speed of the electric vehicle.

10. The method as defined in claim 1, wherein:
   the electric vehicle includes a ground-engaging member; and
   the actual speed of the electric vehicle is based on an operating speed of the ground-engaging member.

11. The method as defined in claim 1, wherein the speed threshold corresponds to an expected speed of the electric vehicle when the powertrain of the electric vehicle is operated to generate the restricted power output.

12. The method as defined in claim 1, wherein the speed threshold is a predetermined non-variable value.

13. The method as defined in claim 1, wherein the speed threshold is variable during a current driving session of the electric vehicle.

14. The method as defined in claim 13, comprising:
sensing an environmental condition in which the electric vehicle is being operated; and
adjusting the speed threshold based on the environmental condition.

15. The method as defined in claim 14, wherein the environmental condition includes a terrain inclination.

16. The method as defined in claim 1, comprising, when a duration during which the powertrain of the electric vehicle is commanded to exceed the restricted power output reaches a prescribed duration:
ceasing to command the powertrain of the electric vehicle to exceed the restricted power output; and
causing the electric vehicle to remain in the restricted operating mode.

17. The method as defined in claim 1, comprising, when a duration during which the powertrain of the electric vehicle is commanded to exceed the restricted power output reaches a prescribed duration, causing the electric vehicle to transition to another operating mode less restrictive than the restricted operating mode.

18. A system for operating an electric vehicle, the system comprising:
one or more data processors operatively connected to a powertrain of the electric vehicle; and
non-transitory machine-readable memory storing instructions executable by the one or more data processors and configured to cause the one or more data processors to:
receive a restricted mode command to operate the electric vehicle in a restricted operating mode defining a restricted power output from a powertrain of the electric vehicle, the restricted power output being lower than a maximum power output available from the powertrain of the electric vehicle;
when the electric vehicle is in the restricted operating mode, receive an operator propulsion command from an operator of the electric vehicle, the operator propulsion command being equal to or exceeding a propulsion command threshold;
command the powertrain of the electric vehicle to generate a first power output corresponding to the operator propulsion command, the first power output being lower than or equal to the restricted power output;
when the powertrain of the electric vehicle is generating the first power output, determine an actual speed of the electric vehicle; and
when the operator propulsion command is exceeding the propulsion command threshold and the actual speed of the electric vehicle is below a speed threshold and the electric vehicle is in the restricted operating mode, command the powertrain of the electric vehicle to generate a second power output exceeding the restricted power output in response to the operator propulsion command.

19. An electric vehicle comprising:
a powertrain including an electric motor for propelling the electric vehicle;
a motoring battery operatively connected to drive the electric motor;
an accelerator to receive an operator propulsion command from an operator of the electric vehicle; and
a controller operatively connected to the powertrain and to the accelerator, the controller being configured to:
receive a restricted mode command to operate the electric vehicle in a restricted operating mode defining a restricted power output from a powertrain of the electric vehicle, the restricted power output being lower than a maximum power output available from the powertrain of the electric vehicle;
when the electric vehicle is in the restricted operating mode, receive an operator propulsion command via the accelerator, the operator propulsion command being equal to or exceeding a propulsion command threshold;
command the powertrain of the electric vehicle to generate a first power output corresponding to the operator propulsion command, the first power output being lower than or equal to the restricted power output;
when the powertrain of the electric vehicle is generating the first power output, determine an actual speed of the electric vehicle; and
when the operator propulsion command is exceeding the propulsion command threshold and the actual speed of the electric vehicle is below a speed threshold and the electric vehicle is in the restricted operating mode, command the powertrain of the electric vehicle to generate a second power output exceeding the restricted power output in response to the operator propulsion command.

20. The electric vehicle as defined in claim 19, wherein the electric vehicle is a snowmobile.

* * * * *